US012634926B2

(12) United States Patent (10) Patent No.: US 12,634,926 B2

Matsumura et al. (45) Date of Patent: May 19, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Haruhi Echigo, Tokyo (JP); Naoya Shibaike, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 333 days.

(21) Appl. No.: 18/263,436

(22) PCT Filed: Jan. 29, 2021

(86) PCT No.: PCT/JP2021/003223

§ 371 (c)(1),
(2) Date: Jul. 28, 2023

(87) PCT Pub. No.: WO2022/162866

PCT Pub. Date: Aug. 4, 2022

(65) Prior Publication Data

US 2024/0089955 A1 Mar. 14, 2024

(51) Int. Cl.
*H04W 72/12* (2023.01)
*H04L 5/00* (2006.01)
(Continued)

(52) U.S. Cl.
CPC ....... *H04W 72/1268* (2013.01); *H04L 5/0091* (2013.01); *H04W 72/232* (2023.01)

(58) Field of Classification Search
CPC ............ H04W 72/1268; H04W 72/232; H04L 5/0091
See application file for complete search history.

(56) References Cited

U.S. PATENT DOCUMENTS

2009/0262678 A1    10/2009 Oyman et al.
2020/0337024 A1    10/2020 Tang
(Continued)

FOREIGN PATENT DOCUMENTS

JP        2007-227850 A       9/2007
JP        2008227850 A       9/2008
(Continued)

OTHER PUBLICATIONS

Extended European Search Report issued in counterpart European Patent Application No. 21922882.2, mailed on Sep. 27, 2024 (8 pages).
(Continued)

*Primary Examiner* — Ronald B Abelson
(74) *Attorney, Agent, or Firm* — Osha Bergman Watanabe & Burton LLP

(57) ABSTRACT

A terminal according to one aspect of the present disclosure includes a receiving section that receives information related to a transmission path for at least a part of UL data; and a control section that determines at least one of a transmission method of the UL data and a second terminal other than the terminal, the second terminal being notified of at least the part of the UL data, based on at least one of the information related to the transmission path and downlink control information used for scheduling of the UL data.

9 Claims, 39 Drawing Sheets

(51) Int. Cl.

| | |
|---|---|
| *H04W 72/1268* | (2023.01) |
| *H04W 72/23* | (2023.01) |
| *H04W 72/232* | (2023.01) |

(56) References Cited

U.S. PATENT DOCUMENTS

| | | | | |
|---|---|---|---|---|
| 2021/0329528 A1* | 10/2021 | Kang | .................... | H04L 47/283 |
| 2024/0049270 A1* | 2/2024 | Su | ......................... | H04W 72/53 |

FOREIGN PATENT DOCUMENTS

| | | | |
|---|---|---|---|
| JP | 2019-506055 A | 2/2019 |
| JP | 2019-75743 A | 5/2019 |
| JP | 2019-516264 A | 6/2019 |
| WO | 2017117253 A1 | 7/2017 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).

International Search Report issued in PCT/JP2021/003223 on Sep. 7, 2021 (7 pages).

Written Opinion of the International Searching Authority issued in PCT/JP2021/003223 on Sep. 7, 2021 (4 pages).

Office Action issued in Japanese Patent Application No. 2022-577946, issued Mar. 18, 2025 (8 pages).

Office Action issued in European Patent Application No. 21922882. 2; Dated Dec. 18, 2025 (5 pages).

* cited by examiner

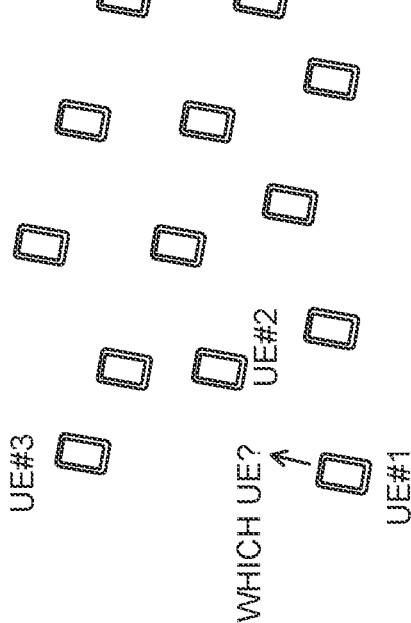
FIG. 3

| CODE POINT | PATH |
|---|---|
| 00 | UE#1→UE#2→UE#3 |
| 01 | UE#1→UE#3 |
| 10 | UE#1→UE#2→UE#4 |
| 11 | UE#1→UE#4 |

FIG. 9A

| INITIAL TRANSMISSION/ RETRANSMISSION | PATH |
|---|---|
| INITIAL TRANSMISSION | UE#1→UE#2→UE#3 |
| RETRANSMISSION | UE#1→UE#3 |

FIG. 9B

INDICATED BY DCI FOR INITIAL TRANSMISSION

INDICATED BY DCI FOR RETRANSMISSION

| CODE POINT | PATH |
|---|---|
| 00 | UE#1→UE#2→UE#3 |
| 01 | UE#1→UE#3 |
| 10 | UE#1→UE#2→UE#4 |
| 11 | UE#1→UE#4 |

FIG. 10A

INDICATED BY DCI FOR INITIAL TRANSMISSION

| CODE POINT | PATH |
|---|---|
| 00 | UE#1→UE#2→UE#3 |
| 01 | UE#1→UE#3 |
| 10 | UE#1→UE#2→UE#4 |
| 11 | UE#1→UE#4 |

FIG. 10B

| PATH |
|---|
| UE#1→UE#3 |

UE#3

UE#2

UE#1

CW#2

TRANSFER BETWEEN UEs

UE COOPERATIVE MIMO TRANSMISSION

CW#1

CASE OF INITIAL TRANSMISSION

UE#3

UE#2

UE#1

UE NON-COOPERATIVE MIMO TRANSMISSION

CW#2

CW#1

CASE OF RETRANSMISSION

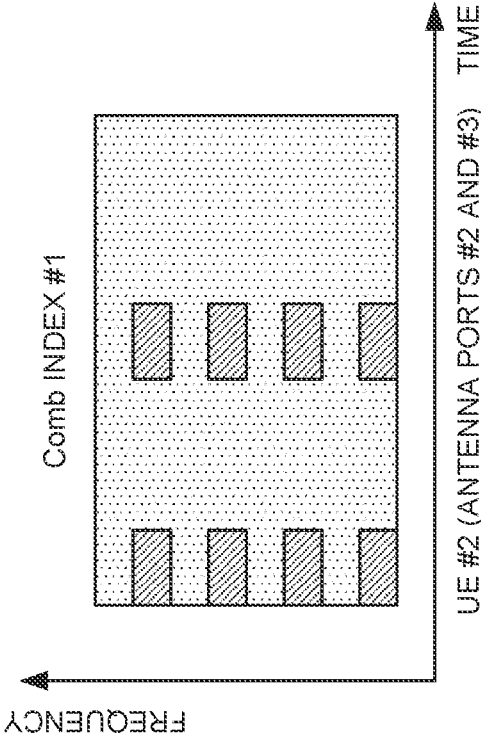
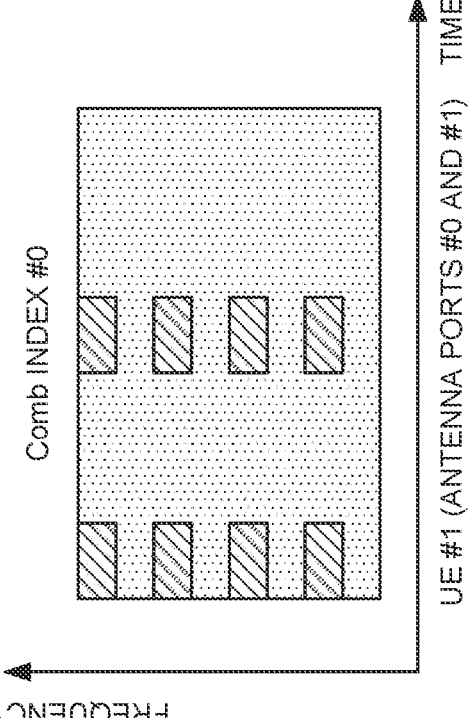
FIG. 17

| TPMI | TPMI INDEX (UE#1) | TPMI INDEX (UE#1) |
|---|---|---|
| 000 | 0 | 0 |
| 001 | 1 | 0 |
| ... | ... | ... |
| 111 | 7 | 3 |

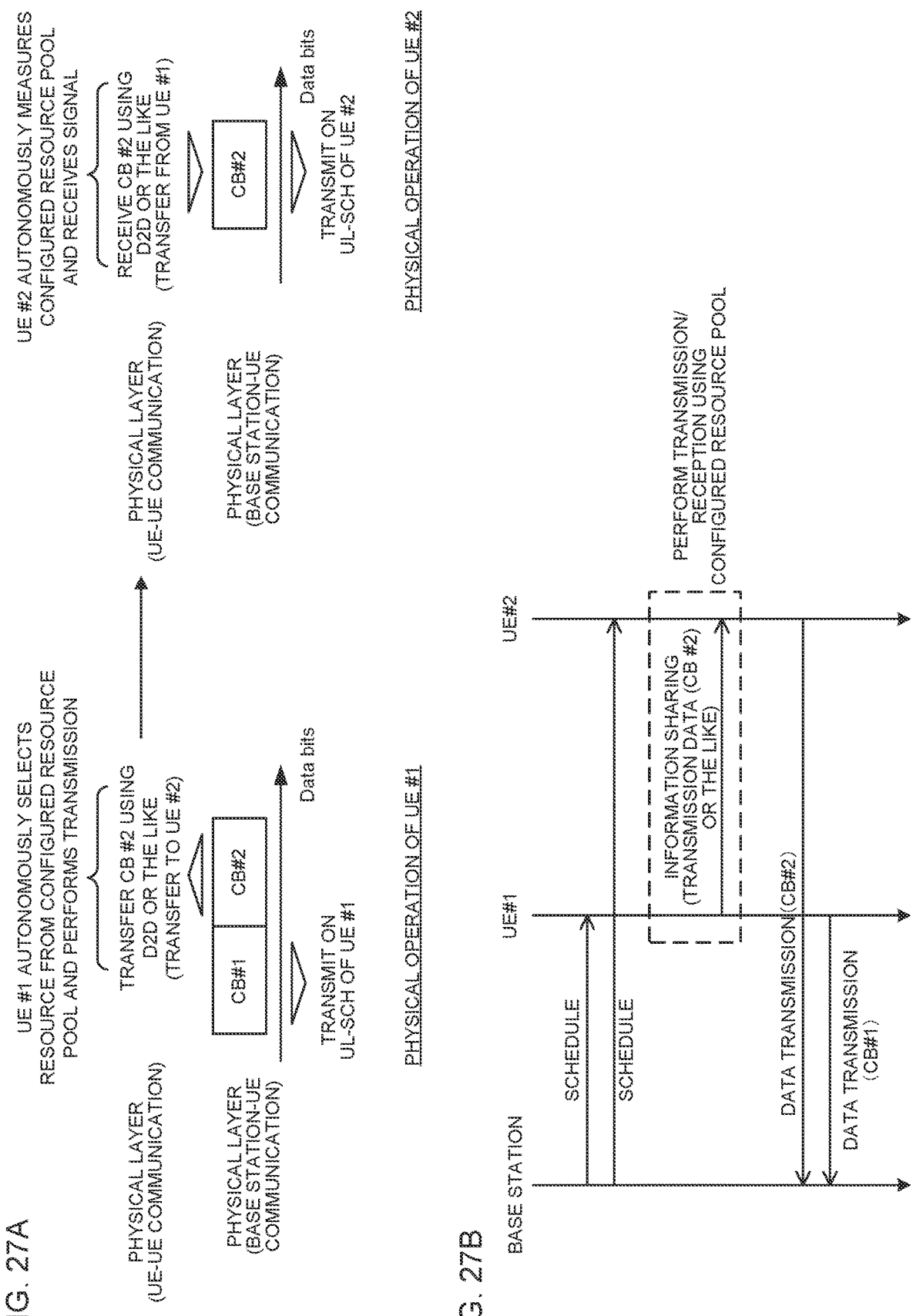

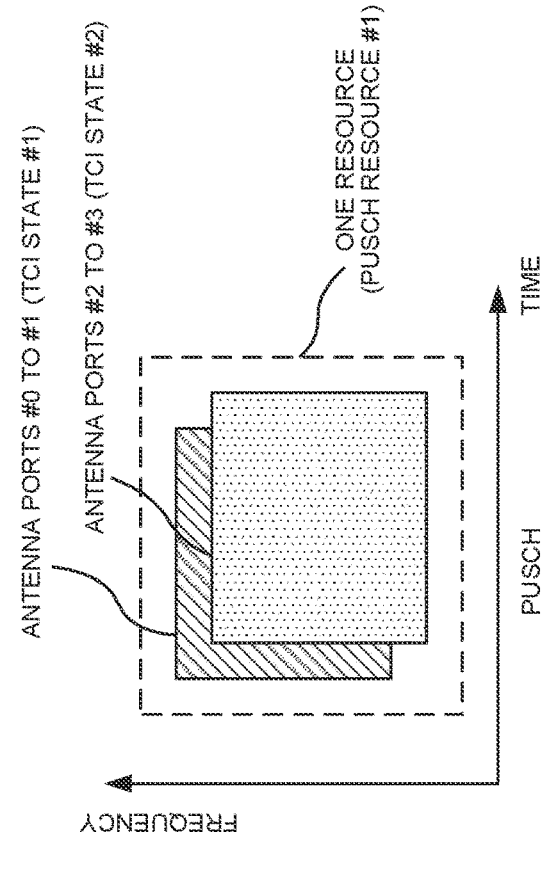
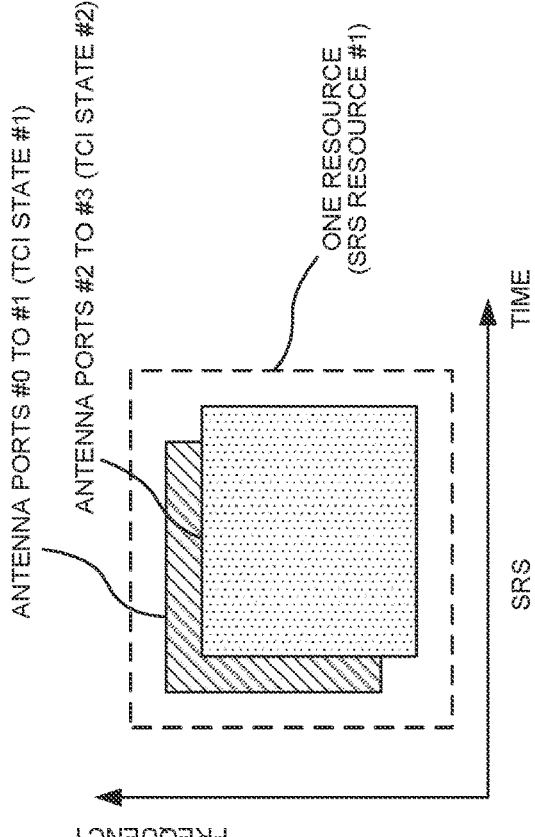
FIG. 32

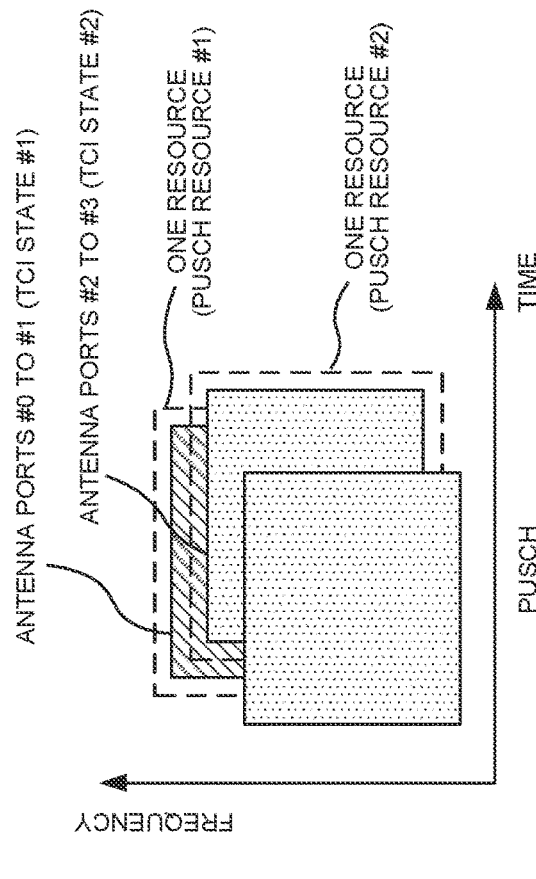
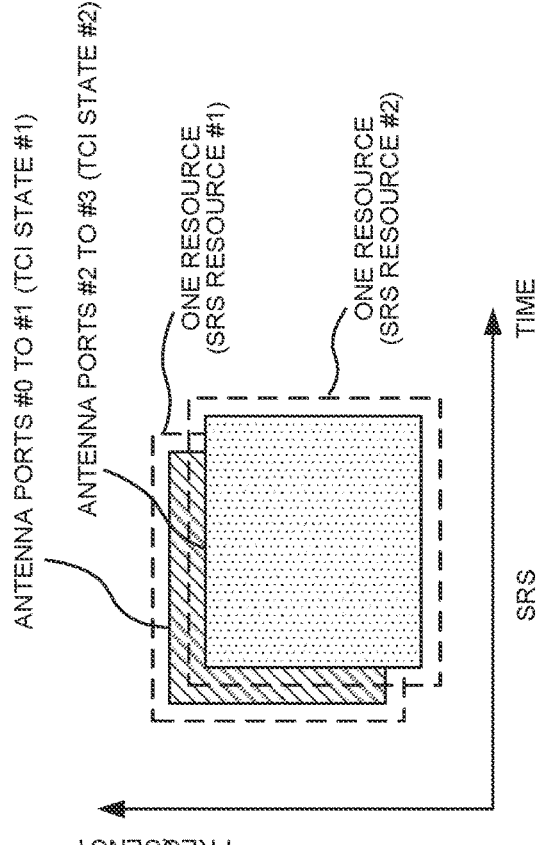
FIG. 33

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

In existing systems (for example, LTE systems), a MIMO (Multi Input Multi Output) system is supported as a radio communication technology in which data is transmitted and received using a plurality of antennas to enhance data rates (spectral efficiency). In the MIMO system, a plurality of transmit/receive antennas are prepared in a transceiver, and different transmission information sequences are simultaneously transmitted from different transmit antennas.

The MIMO system defines single user MIMO (SU-MIMO) in which transmission information sequences simultaneously transmitted from different transmit antennas are all for the same user, and multi-user MIMO (MU-MIMO (Multiple User MIMO)) in which the transmission information sequences are for different users.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), performing communication by enhancing the MIMO system has been under study.

For example, it is assumed that UL transmission of a given terminal is performed using antennas/antenna ports of a plurality of terminals including the terminal (UE cooperative MIMO), or is performed using another terminal.

However, a full study has not been carried out on how to control communication using antenna(s)/antenna port(s) of another UE or a plurality of UEs.

In view of this, the present disclosure has one object to provide a terminal, a radio communication method, and a base station with which communication can be appropriately controlled in a configuration in which communication using antenna(s)/antenna port(s) of another UE or a plurality of UEs is supported.

Solution to Problem

A terminal according to one aspect of the present disclosure includes a receiving section that receives information related to a transmission path for at least a part of UL data; and a control section that determines at least one of a transmission method of the UL data and a second terminal other than the terminal, the second terminal being notified of at least the part of the UL data, based on at least one of the information related to the transmission path and downlink control information used for scheduling of the UL data.

Advantageous Effects of Invention

According to one aspect of the present disclosure, communication can be appropriately controlled in a configuration in which communication using antenna(s)/antenna port(s) of another UE or a plurality of UEs is supported.

BRIEF DESCRIPTION OF DRAWINGS

FIG. 3 is a diagram for illustrating a problem of UE selection in transfer between UEs.

FIG. 9A and FIG. 9B are diagrams to show examples of a notification method for transmission paths according to the second embodiment.

FIG. 10A and FIG. 10B are diagrams to show other examples of the notification method for transmission paths according to the second embodiment.

FIG. 12A and FIG. 12B are diagrams to show other examples of UL transmission control according to the third embodiment.

FIG. 17 is a diagram to show an example of resource assignment in UE cooperative MIMO according to a sixth embodiment.

FIG. 27A and FIG. 27B are diagrams to show other examples of control of information sharing between UEs in UE cooperative MIMO according to the eighth embodiment.

FIG. 32 is a diagram to show another example of SRS transmission and PUSCH transmission in UE cooperative MIMO according to the ninth embodiment.

FIG. 33 is a diagram to show another example of SRS transmission and PUSCH transmission in UE cooperative MIMO according to the ninth embodiment.

DESCRIPTION OF EMBODIMENTS (MIMO Enhancement)

In future radio communication systems, enhancing throughput of communication by increasing the number of antennas/antenna ports (hereinafter also referred to as antenna ports) of a terminal has been under study. At the same time, when the number of antenna ports in a UE is increased, because a distance between the antenna ports is required, the increase of the number of antenna ports is limited due to the size of each UE or the like.

When increasing the number of antenna ports for each UE is limited, in order to enhance throughput of each UE/capacity of each cell, use of UE cooperative MIMO (for example, UE cooperative MIMO), Tx/Rx diversity, multi-user MIMO (MU-MIMO enhancement), or the like is assumed.

In application of UE cooperative MIMO, when there is an upper limit for the number of antenna ports due to the limitation of the UE size or the like, an ostensible number of antenna ports can be increased by using the antenna ports of a plurality of UEs. Reduction of spatial correlation through use of antenna ports at different positions (or different antenna port numbers 9) is also defined. UE cooperative MIMO may be interpreted as UE collaborated MIMO, UE cooperative MIMO, cooperative transmission between the UEs, collaborated transmission between the UEs, cooperative reception between the UEs, collaborated reception between the UEs, or the like.

Figures 1A, 1B:
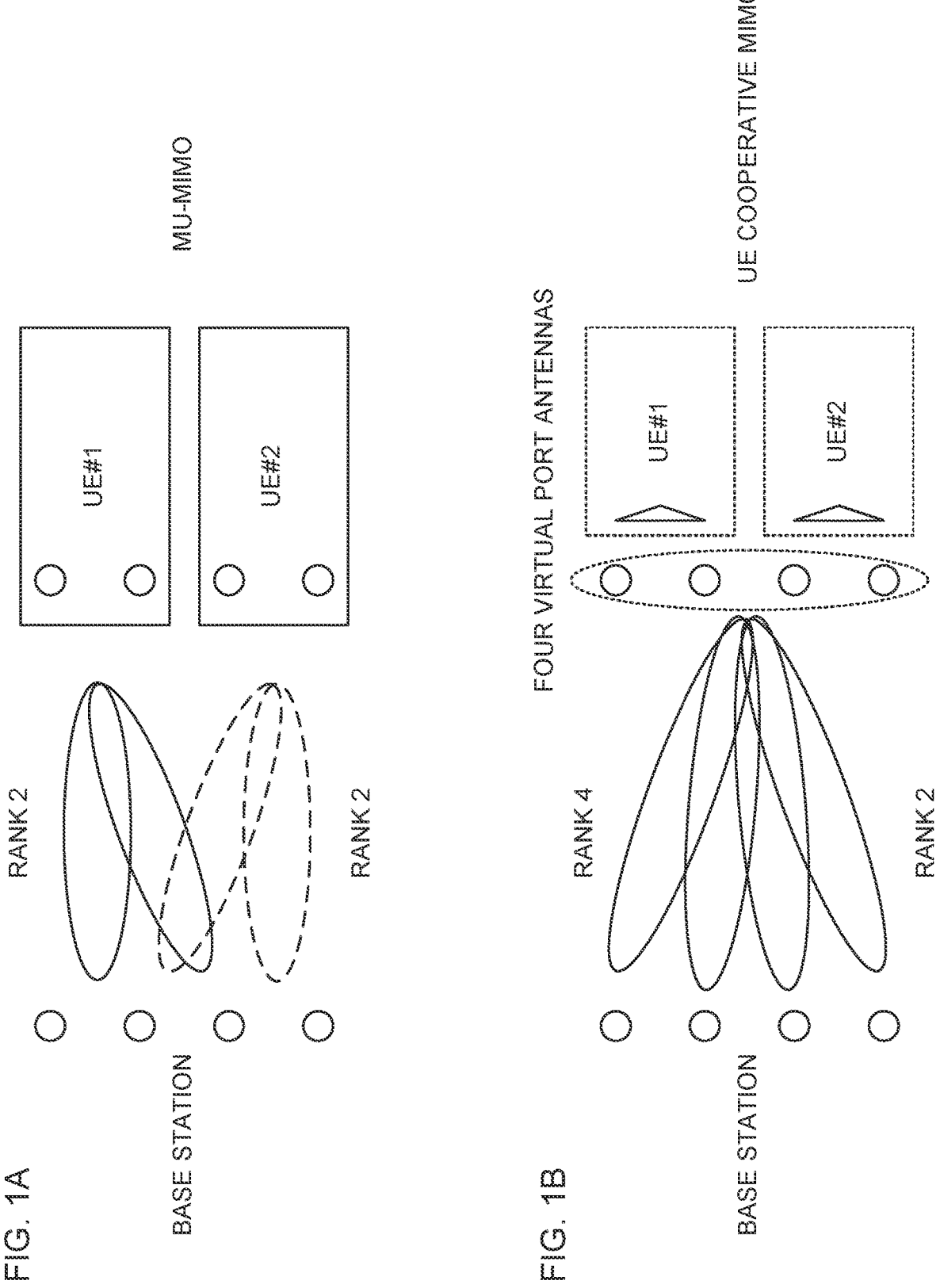
FIG. 1A and FIG. 1B are diagrams to show examples of MU-MIMO and UE cooperative MIMO.

When four antenna ports (or four ranks/four layers) are used in communication between a base station and a plurality of UEs, in MU-MIMO, it corresponds to rank-2 SU-MIMO for each UE (see FIG. 1A). In contrast, in UE cooperative MIMO, it corresponds to rank-4 SU-MIMO (or four virtual port antennas) (see FIG. 1B).

For example, in UE cooperative MIMO (for example, FIG. 1B), rank-4 data (for example, DL data/DL-SCH) for UE #1 may be transmitted to UE #1 and UE #2, and the data may be transferred from UE #2 to UE #1. In this manner, even when UE #1 includes only two antenna ports, UE #1 can receive data corresponding to four antenna ports.

Alternatively, in UE cooperative MIMO (for example, FIG. 1B), data (for example, UL data/UL-SCH) of UE #1 may be transmitted from UE #1 and UE #2. In this manner, even when UE #1 includes only two antenna ports, UE #1 can transmit data corresponding to four antenna ports (four virtual port antennas).

Figure 2:
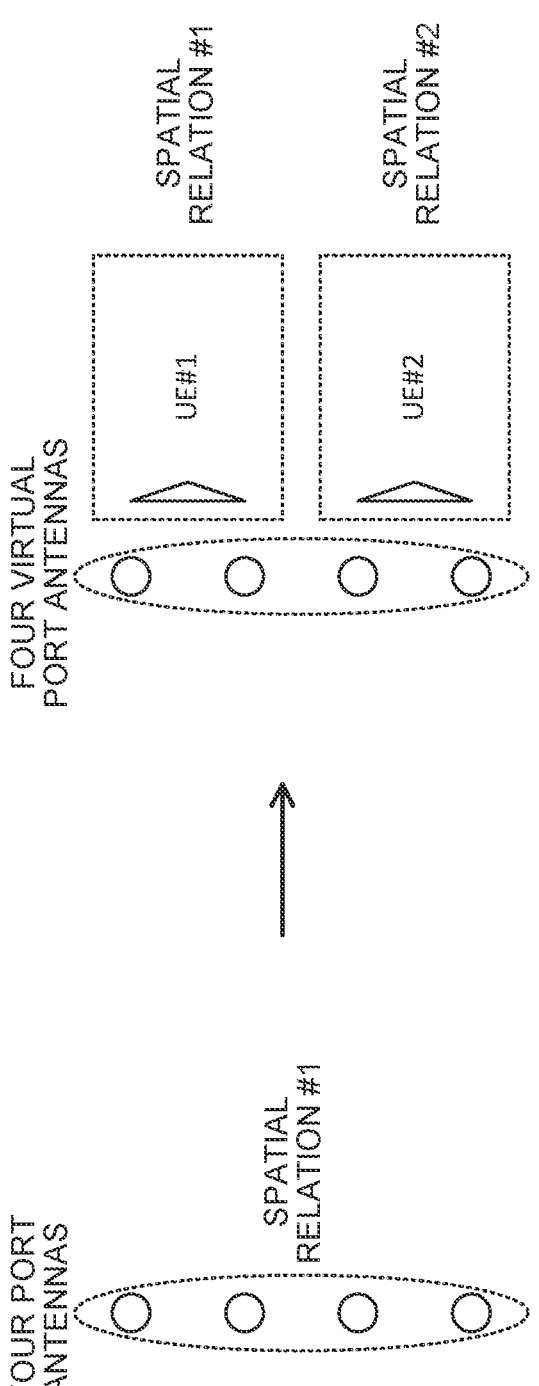
FIG. 2 is a diagram to show an example of antenna ports in UE cooperative MIMO.

As described above, it is assumed that UL transmission/DL reception of a given terminal is performed using antennas/antenna ports of a plurality of terminals including the terminal (UE cooperative MIMO). In this manner, communication can be performed using a larger number of antenna ports than the number of antenna ports supported by the terminal (see FIG. 2). FIG. 2 shows an example of a case in which UEs each including two antenna ports cooperate with each other and perform communication using four antenna ports (four virtual port antennas).

However, a full study has not been carried out on how to control communication (for example, UL transmission processing/DL reception processing) using antenna port(s) of another UE/a plurality of UEs.

For example, when at least a part of UL data of a given terminal is transmitted using an antenna port of another terminal, how to select/determine such another terminal presents a problem.

For example, when cooperative MIMO transmission between the UEs is performed by allowing a part of data of a given terminal to be transferred to another terminal, how to select/determine a UE to be paired with (for example, a UE to which data is transferred) among a plurality of UEs presents a problem (see FIG. 3). For example, in FIG. 3, when cooperative MIMO transmission between the UEs is performed by allowing at least a part of UL data of UE #1 to be transferred to another UE, how to determine a UE to be paired with UE #1 presents a problem.

It is also assumed that data is transferred via a plurality of other UEs. In this case, however, how to select/determine a transfer path for the data presents a problem.

Alternatively, how to establish synchronization (for example, carrier frequency/phase/transmission timing) between the UEs presents a problem. Alternatively, how to share data/control information between the UEs presents a problem. Alternatively, how to control scheduling/retransmission in transmission using UE cooperative MIMO presents a problem. Alternatively, how to configure a beam/TCI state/spatial relation applied to (or corresponding to/related to) each antenna port presents a problem. Alternatively, how to control retransmission control in a case of using UE cooperative MIMO presents a problem.

In view of this, the inventors of the present invention studied UE operation/base station operation to solve at least one of the problems described above, and came up with the idea of the present embodiment.

Embodiments according to the present disclosure will be described in detail with reference to the drawings as follows. The radio communication methods (or UE operation/base station operation) according to respective embodiments may each be employed individually, or may be employed in combination.

In the present disclosure, "A/B" and "at least one of A and B" may be interchangeably interpreted. At least one of A and B may be interpreted as A and B. Similarly, in the present disclosure, "A/B/C" and "at least one of A, B, and C" may be interchangeably interpreted. At least one of A, B, and C may be interpreted as A and B, A and C, or B and C.

In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, "support", "control", "can control", "can operate", and "can operate" may be interchangeably interpreted.

In the present disclosure, configure, activate, update, indicate, enable, specify, and select may be interchangeably interpreted.

In the present disclosure, use, determine, apply, and select may be interchangeably interpreted.

In the present disclosure, link, associate, correspond, and map may be interchangeably interpreted. In the present disclosure, allocate, assign, monitor, and map may be interchangeably interpreted.

In the present disclosure, higher layer signaling may be, for example, any one of Radio Resource Control (RRC) signaling, Medium Access Control (MAC) signaling, broadcast information, and the like, or a combination of these. In the present disclosure, RRC, RRC signaling, an RRC parameter, a higher layer, a higher layer parameter, an RRC information element (IE), and an RRC message may be interchangeably interpreted.

As the MAC signaling, for example, a MAC control element (MAC CE), a MAC Protocol Data Unit (PDU), or the like may be used. The broadcast information may be, for example, a master information block (MIB), a system information block (SIB), minimum system information (Remaining Minimum System Information (RMSI)), other system information (OSI), or the like.

In the present disclosure, transmission confirmation information, a HARQ-ACK, a HARQ-ACK/NACK, HARQ-ACK information, a HARQ, an ACK/NACK, an ACK, a NACK, a NACK only, and UCI may be interchangeably interpreted.

In the present disclosure, specific, dedicated, UE-specific, and UE-dedicated may be interchangeably interpreted.

In the present disclosure, common, shared, group-common, UE-common, and UE-shared may be interchangeably interpreted.

In the present disclosure, UE-dedicated DCI and DCI having a CRC scrambled with a UE-dedicated RNTI may be interchangeably interpreted. The UE-dedicated RNTI may be a C-RNTI, for example.

In the present disclosure, UE-common DCI and DCI having a CRC scrambled with a UE-common RNTI may be interchangeably interpreted. The UE-common RNTI may be a multicast-RNTI, for example.

The following description will illustrate a case in which two UEs (UE #1 and UE #2) cooperate with each other and perform transmission; however, the number of UEs that perform cooperative transmission may be three or more. The following description will illustrate a case in which two antenna ports are included in each UE; however, the number of antenna ports included in each UE is not limited to this. In UE #1 and UE #2, the same number of antenna ports may be included, or different numbers of antenna ports may be included. The following description will take an example of cooperative transmission in the UL; however, this is not restrictive. A similar mechanism may be applied also in a case in which a plurality of UEs cooperate with each other and transmit DL data.

The following embodiments will illustrate a case in which a plurality of (for example, two) UEs cooperate with each other and perform transmission; however, the present embodiment may be used for communication control other than cooperative MIMO between the UEs. For example, the present embodiment may be applied to a configuration in which data (for example, all of data) of a given UE is transmitted to a network/base station via another UE (for example, data transmission based on multi-hop using a plurality of UEs). In the present disclosure, data transmission using cooperative MIMO between the UEs may be interpreted as data transmission based on multi-hop using a plurality of UEs.

First Embodiment

When UE cooperative MIMO is applied, the UE may determine at least one of another terminal to which data of the UE is transferred, resources, and a transfer path, based on information notified/configured from the network (for example, the base station).

Figure 4A:
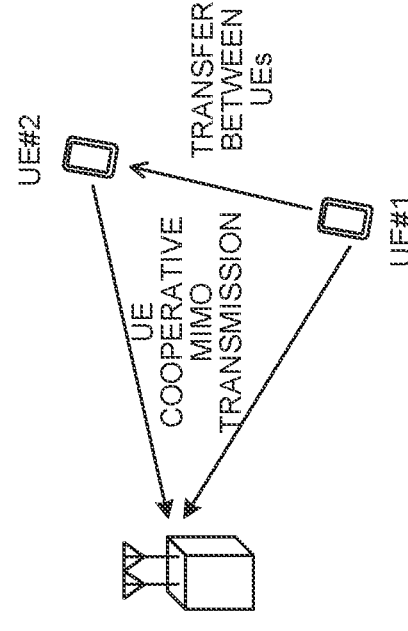
FIG. 4A and FIG. 4B are diagrams to show examples of transfer between UEs.
Figure 4B:
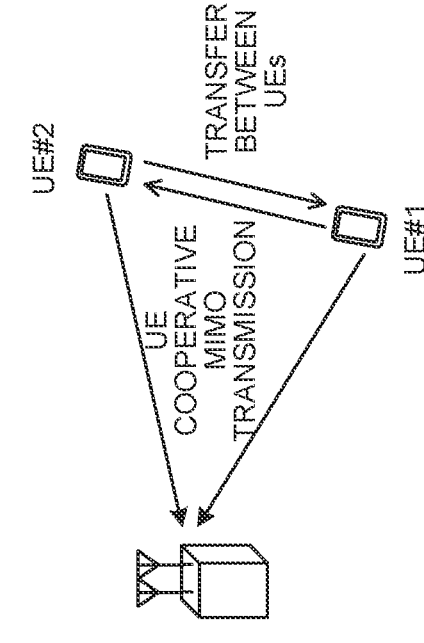

Note that the following description will take an example in which data is transferred from a given UE (for example, UE #1) to another UE (for example, UE #2) (see FIG. 4A), but this is not restrictive. The following description may also be similarly applied to a case in which data of UE #1 is transferred to UE #2 and data of UE #2 is also transferred to UE #1 (see FIG. 4B). To transfer may be interpreted as to notify, to report, to transmit, or to share information.

Information notified from the base station may be information related to a transmission path for data. The information related to the transmission path for data may be at least one of information related to another UE to which the data is transferred and information related to resources used for transfer of the data. When data of a given UE is transferred via a plurality of other terminals, the information related to the transmission path for data may include at least one of information related to order of UEs to which the data is transferred and information related to the UE that performs data transmission to the base station. The transmission path may be interpreted as a transfer path, transmission order, or transfer order.

The base station may notify the UEs of scheduling/resources for transfer between the UEs and scheduling/resources between the UEs and the base station, using downlink control information (for example, common downlink control information). Each UE may control data transmission of the UE using transfer between the UEs/multi-hop between the UEs, based on scheduling/resource information from the base station.

Information notified from the base station may be at least one of semi-statically notified information (for example, higher layer signaling) and dynamically notified information (for example, downlink control information). A combination of higher layer signaling and downlink control information may be used for notification.

<Semi-Static Notification>

The base station may give notification of/configure information related to the transmission path (for example, information related to another UE/information related to resources), using higher layer signaling (or a higher layer parameter). Information related to another UE may be identification information of another UE/resources used for communication with another UE. The identification information of another UE may be at least one of a UE index of such another UE, a virtual UE index thereof, and an RNTI (for example, a C-RNTI) corresponding to such another UE. Resources used for communication with another UE may be resources for data transmission/reception used for transfer of data.

Figures 5A, 5B, 5C:
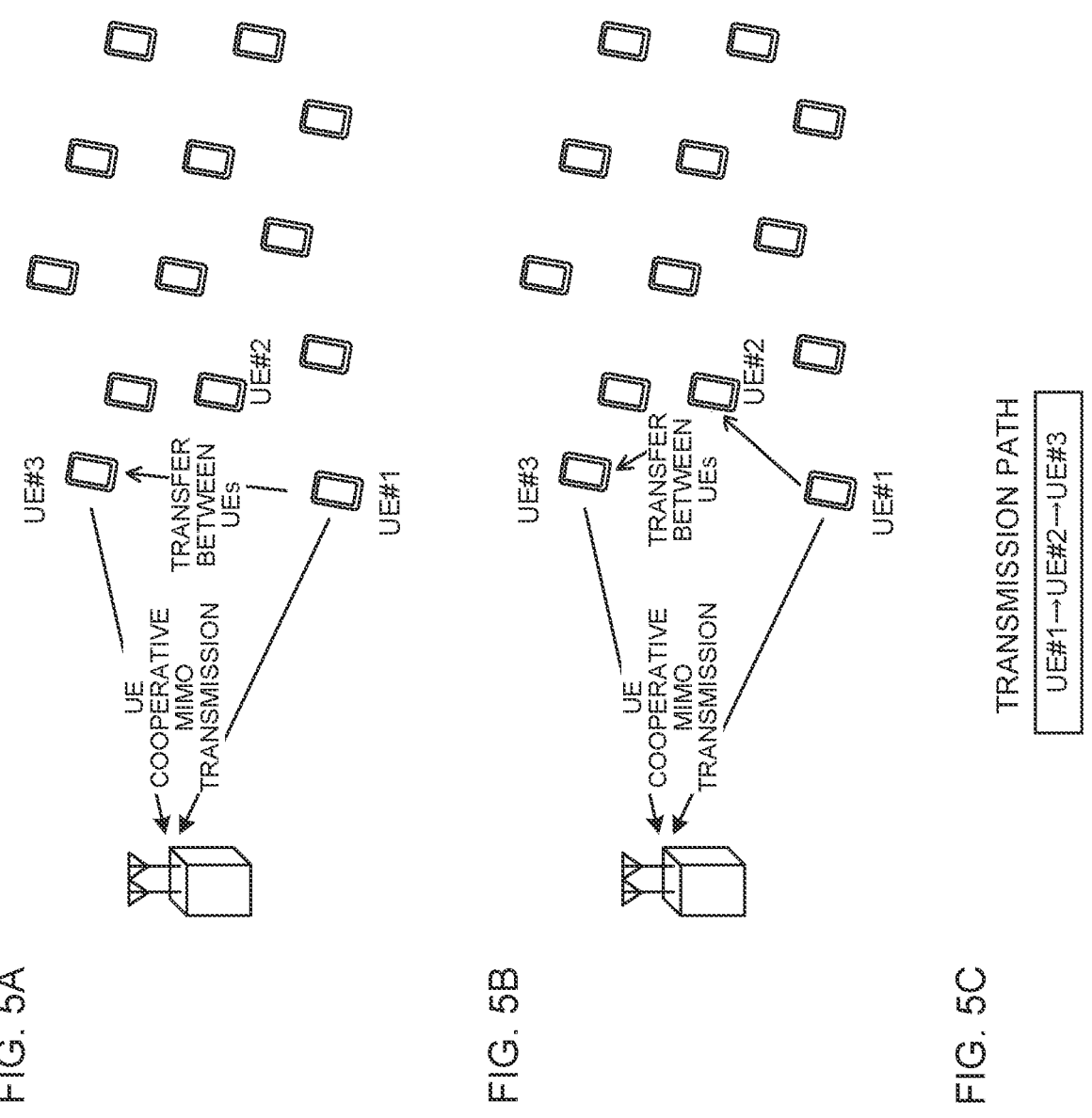
FIG. 5A to FIG. 5C are diagrams to show examples of transmission paths in transfer between UEs according to a first embodiment.

FIG. 5A shows a case in which UE #1 acquires information of UE #3 as the information related to another UE and transfers a part of UL data to UE #3. When data of a given UE is transferred to another UE, the given UE may be referred to as a transmission source UE (or a transfer source UE), and such another UE as a transmission destination UE (or a transfer destination UE). In FIG. 5A, UE #1 corresponds to a transmission source UE, and UE #2 corresponds to a transmission destination UE.

Data (for example, at least a part of UL data) from UE #1 may be transferred via a plurality of UEs (see FIG. 5B). FIG. 5B shows a case in which data from UE #1 is transferred to UE #3 via UE #2. In this case, UE #1 and UE #3 may cooperate with each other and perform UL transmission. Alternatively, UE #1, UE #2, and UE #3 may cooperate with each other and perform UL transmission.

In FIG. 5B, UE #1 corresponds to a transmission source UE, and UE #3 corresponds to a transmission destination UE. UE #2 may correspond to a transmission destination UE for UE #1 and a transmission source UE for UE #3.

FIG. 5B shows a case in which transfer between the UEs is performed with two hops (or two steps), but this is not restrictive. The transfer between the UEs may be performed with more than two hops. The number of hops may be configured with higher layer signaling, or may be determined based on a value reported with a UE capability report (for example, UE capability signaling).

[Notification/Configuration for Transmission Source UE]

The base station may notify/configure the transmission source UE of/with identification information of the transmission destination UE/information related to resources for communication (for example, resources for data transmission) with the transmission destination UE, using higher layer signaling. In the case shown in FIG. 5B, the base station may notify UE #1 of at least identification information of UE #2/information related to resources used for communication with UE #2. The base station may notify UE #2 of at least identification information of UE #3/information related to resources used for communication with UE #3.

Identification information of UE #3/information related to resources used for communication with UE #2 and UE #3 need not be notified to UE #1. Alternatively, the identification information of UE #3/the information related to resources used for communication with UE #2 and UE #3 may be notified to UE #1, and the information may be notified from UE #1 to UE #2.

As an index of each UE (for example, a UE index of each transmission destination), scrambling identification information (for example, an SCID) of a physical layer and an ID of a higher layer may be dedicatedly configured for the UE. The index may be configured in a higher layer, or may be provided for the UE in advance (for example, provided when the UE is shipped).

A transmitting side (for example, a transmitting UE) may recognize an index of a receiving side (for example, a receiving UE) and perform reception processing (for example, demodulation/decoding) by using an SCID for data transmission/reception of a physical layer. In this case, a UE ID may also be included in a higher layer of received data.

[Notification/Configuration for Transmission Destination UE]

The base station may notify/configure the transmission destination UE of/with identification information of the transmission source UE/information related to resources for communication (for example, resources for data reception) with the transmission source UE, using higher layer signaling. In the case shown in FIG. 5B, the base station may notify UE #2 of identification information of UE #1/information related to resources used for communication with UE #1. The base station may notify UE #3 of identification information of UE #2/information related to resources used for communication with UE #2.

Identification information of UE #1/information related to resources used for communication with UE #1 and UE #2 need not be notified to UE #3.

Note that the identification information of the transmission source UE may not be notified to the transmission destination UE. This is because the transmission source UE may receive a signal (for example, data from the transmission source UE) using indicated resources and can thus receive data without recognizing the transmission source UE.

Alternatively, resources for data transmission may be notified to/configured for the transmission source UE, resources for data reception may be notified to/configured for the transmission destination UE, and identification information of another UE may not be notified to the transmission source UE/the transmission destination UE. This is because the UE can perform data transmission/reception without recognizing the identification information of another UE, as long as the UE recognizes at least the resources for data transmission/the resources for data reception. Note that, as resources for transmission and resources for reception between given terminals (for example, between UE #1 and UE #2), the same resources may be notified/configured.

[Notification of Transfer Path Information]

When data from UE #1 is transferred between a plurality of UEs (for example, FIG. 5B), the base station may notify at least one of UE #1 to UE #3 of information related to the path in which the data is transferred (for example, order of transfer between the UEs). For example, information related to a transmission path (in the case of FIG. 5B, UE #1→UE #2→UE #3) may be notified to each UE (see FIG. 5C).

Alternatively, only information related to transmission and reception of each UE may be dedicatedly notified to the UE. For example, information related to reception resources of UE #1 and UE #2 and information related to transmission resources of UE #2 and UE #3 may be notified to UE #2. Alternatively, only the identification information (for example, UE #1) of the transmission source UE and the identification information (for example, UE #3) of the transmission destination UE may be notified to the UE.

<Dynamic Notification>

Figures 6A, 6B:
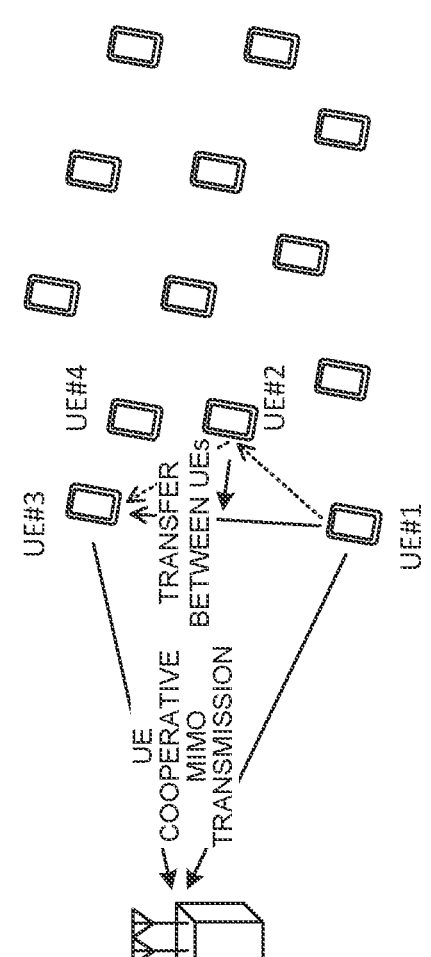
FIG. 6A and FIG. 6B are diagrams to show other examples of transmission paths in transfer between UEs according to the first embodiment.

The base station may configure the information related to another UE/the information related to resources (or a plurality of candidates, a plurality of entries, or a list), using higher layer signaling, and indicate specific information using downlink control information (for example, DCI) (see FIG. 6A). The information related to another UE may include at least one of the identification information of another UE (or the transmission destination UE/the transmission source UE) and the information related to the transfer path.

FIG. 6A shows a case in which paths respectively corresponding to code points of a given field in DCI are configured, using higher layer signaling. When the information related to another UE/the information related to resources is configured using higher layer signaling, a given field may be configured in the DCI. The UE may control transfer of data, based on the given field (see FIG. 6B).

For example, when the code point of the given field is '00', the UE may determine that data of UE #1 is transferred to UE #3 via UE #2. Alternatively, when the code point of the given field is '01', the UE may determine that data of UE #1 is transferred to UE #3 (without passing UE #2). In this manner, the transfer destination/the transfer path for the data of UE #1 can be dynamically changed based on the DCI.

[Notification of Transfer Path Information]

When data from UE #1 is transferred between a plurality of UEs (for example, FIG. 6B), information related to the path in which the data is transferred may be notified to at least one of UE #1 to UE #3. For example, information related to all the path (in the case of '00' in FIG. 6A, UE #1→UE #2→UE #3) may be notified to each UE.

Alternatively, only information related to transmission and reception of each UE may be dedicatedly indicated for the UE, using the DCI. For example, information related to reception resources of UE #1 and UE #2 and information related to transmission resources of UE #2 and UE #3 may be notified to UE #2. Alternatively, only the identification information (for example, UE #1) of the transmission source UE and the identification information (for example, UE #3) of the transmission destination UE may be notified to the UE.

<Assignment of Resources Used for Transfer Between UEs>

The resources used in transfer between the UEs (or in transmission and reception between the UEs) may be notified/configured from the base station (option 1-1), or may be autonomously selected/determined by the UE (option 1-2).

[Option 1-1]

The UE may determine the resources used for transfer of data between the UEs, based on information related to resources configured from the base station, using higher layer signaling/downlink control information. For assignment of the resources for transfer between the UEs from the base station, methods illustrated in a seventh embodiment, an eighth embodiment, and the like to be described later may be used.

[Option 1-2]

When the UE is notified of the identification information of another UE (transmission destination UE/transmission source UE) from the base station, the UE may autonomously select resources and perform transmission processing/reception processing of transfer between the UEs. The resources for transfer between the UEs autonomously determined by the UE may be controlled based on methods illustrated in the eighth embodiment and the like.

The UE (transmission source UE) that transmits data to another UE (transmission destination UE) may include the identification information (for example, a transmission source UE ID) of the transmission source UE in a MAC header, or may subject a transmission signal to CRC scrambling in a receiving-side RNTI (for example, a C-RNTI corresponding to the transmission destination UE).

Second Embodiment

When the UE performs retransmission of UL data, the UE may separately configure transfer paths for data in a case of initial transmission and a case of retransmission, or paths for transmission and reception of data. Here, description will be given by taking an example of a case of initial transmission and a case of retransmission (for example, first retransmission); however, the present disclosure may also be similarly applied to a case of initial transmission and a case of second or subsequent retransmission, or a case of n-th retransmission and a case of (n+1)-th retransmission. Note that the path may be interpreted as resources.

In communication between the UEs, the transfer path for data in the case of initial transmission and the transfer path for data in the case of retransmission may be separately configurable (for example, so as to be different). In the case of initial transmission and the case of retransmission, the UEs (or a pair of UEs/a combination of UEs that perform UE cooperative transmission) that perform data transmission to the base station may be separately configured.

Figures 7A, 7B:
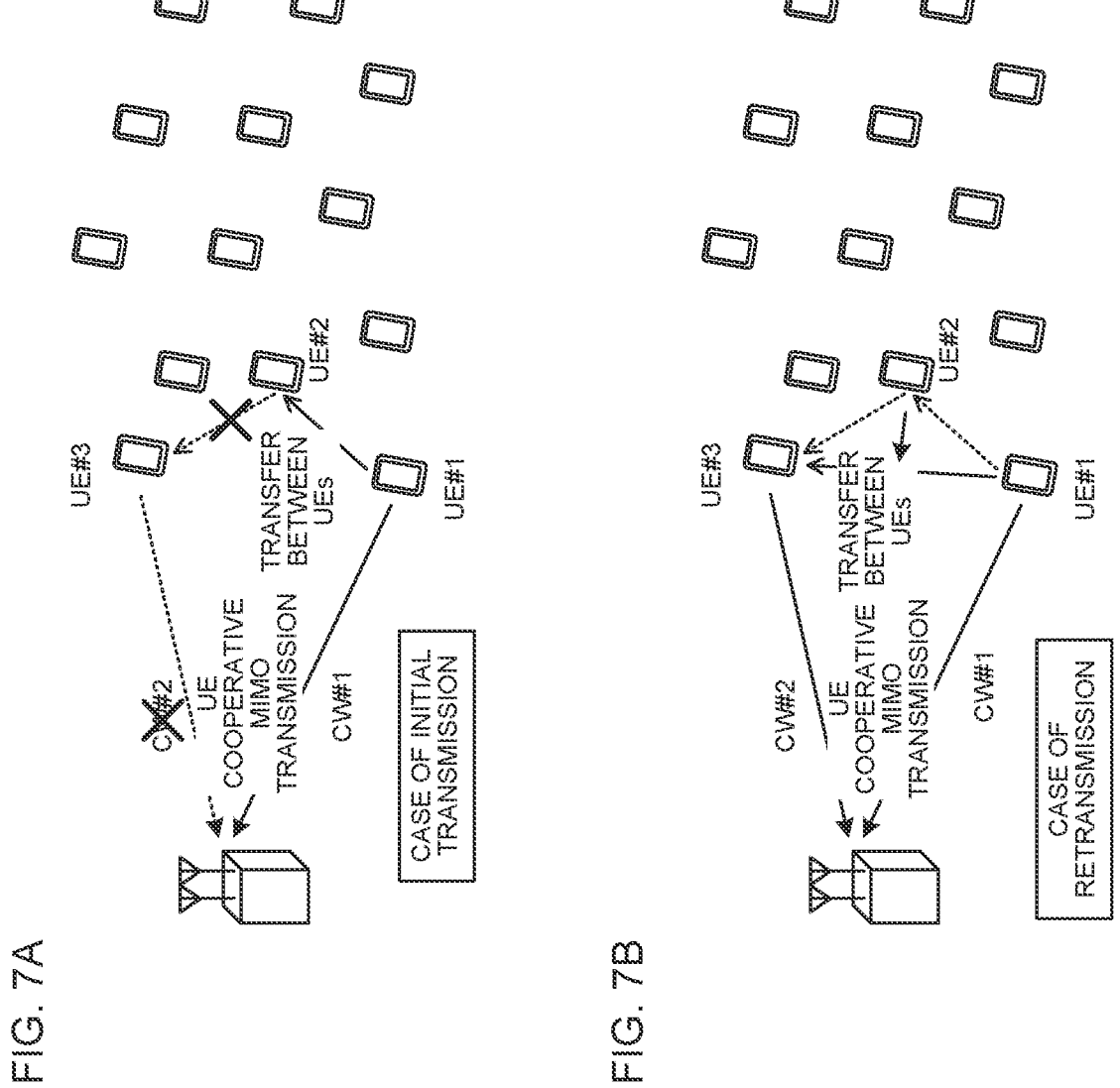
FIG. 7A and FIG. 7B are diagrams to show examples of UL transmission control in a case of initial transmission and retransmission according to a second embodiment.

FIG. 7A and FIG. 7B show an example of a case in which the transfer path for communication between the UEs in the case of initial transmission and the transfer path between the UEs in the case of retransmission are separately configured/applied. Here, shown is an example of retransmission operation of a case in which data (CW #2) transferred from UE #1 to another UE in initial transmission is not appropriately received in the base station (or a case in which a retransmission indication is notified from the base station).

Note that FIG. 7A shows a case in which a part of data (CW #2) of UE #1 is transferred to UE #2, CW #1 is transmitted from UE #1, and CW #2 is transmitted from UE #3, but segmentation units of data are not limited to codewords (CWs). The segmentation units of data may be transport block (TB) units, code block (CB) units, or bit units.

FIG. 7A shows a case in which at least a part (here, CW #2) of UL data is transferred from UE #1 to UE #3 via UE #2, and UE #1 and UE #3 are scheduled/configured to cooperate with each other and perform transmission, in the case of initial transmission. Here, a case is shown in which an error (or a transmission error) occurs in transfer from UE #2 to UE #3. Note that FIG. 7A shows a case in which UE #1 transmits CW #1 and UE #3 transmits CW #2, but this is not restrictive.

FIG. 7B shows a case in which at least a part (here, CW #2) of UL data is transferred from UE #1 to UE #3 (without passing UE #2), and UE #1 and UE #3 are scheduled/configured to cooperate with each other and perform transmission, in the case of retransmission.

When retransmission is performed, the transfer path (or the number of times of transfer) between the UEs in the case of initial transmission and the transfer path (or the number of times of transfer) of the UEs in the case of retransmission may be separately configured. For example, when a transfer error occurs between given UEs (between UE #2 and UE #3 of FIG. 7A), by applying different transfer paths (or numbers of times of transfer) for the case of retransmission and the case of initial transmission, data can be appropriately transmitted to the base station.

FIG. 7B shows a case in which data (here, CW #1) is transmitted from UE #1 to the base station in the case of retransmission, but this is not restrictive. When data from UE #1 is successfully and correctly received in the base station in the case of initial transmission, UE #1 may perform control not to retransmit the data (for example, CW #1) in the case of retransmission.

FIG. 7B shows a case in which data (here, CW #2) is transmitted from UE #3 to the base station in the case of retransmission, similarly to the case of initial transmission, but this is not restrictive. Data may be transmitted from different UEs in the case of initial transmission and the case of retransmission.

Change of the transfer path in the case of retransmission or change of the pair of UEs that perform data transmission to the base station may be applied based on a given condition. The given condition may be a case in which an error occurs in the data (here, CW2) transferred from UE #1. For example, the given condition may be a case in which an error occurs in the transfer between the UEs (for example, between UE #1 and UE #2 or between UEs #2 and #3 in FIG. 7A). Alternatively, the given condition may be a case in which an error occurs in one of the transfer between the UEs and communication between the UE and the base station (between UE #3 and the base station in FIG. 7A).

The path in the case of retransmission may be notified to/configured for the UE using higher layer signaling in advance, or may be indicated for the UE using DCI in scheduling of retransmission (for example, scheduling of a PUSCH for retransmission data/assignment of resources for transfer between the UEs).

For example, the path in the case of initial transmission and the path in the case of retransmission may be separately configured using higher layer signaling, based on the method illustrated in a first aspect. For the UE, the paths may be separately configured for the case of initial transmission and the case of retransmission, and when an error occurs in the initial transmission, transmission of data/transfer between the UEs may be performed using a given retransmission path.

Alternatively, in the case of initial transmission and the case of retransmission, the paths may each be indicated by DCI for each scheduling of data. In this case, by associating values of the given field in the DCI with different values in the case of initial transmission and the case of retransmission, change of paths may be indicated.

Alternatively, the UE may autonomously determine the path in the case of retransmission.

FIG. 7A and FIG. 7B show a case in which the transfer paths are changed when an error occurs in the data (CW #2) transferred from UE #1 to another UE in initial transmission, but this is not restrictive. When an error occurs in data transmission other than transfer between the UEs (for example, data transmission between the UE and the base station), the UE that transmits data to the base station may be changed in the case of retransmission.

Figure 8A:
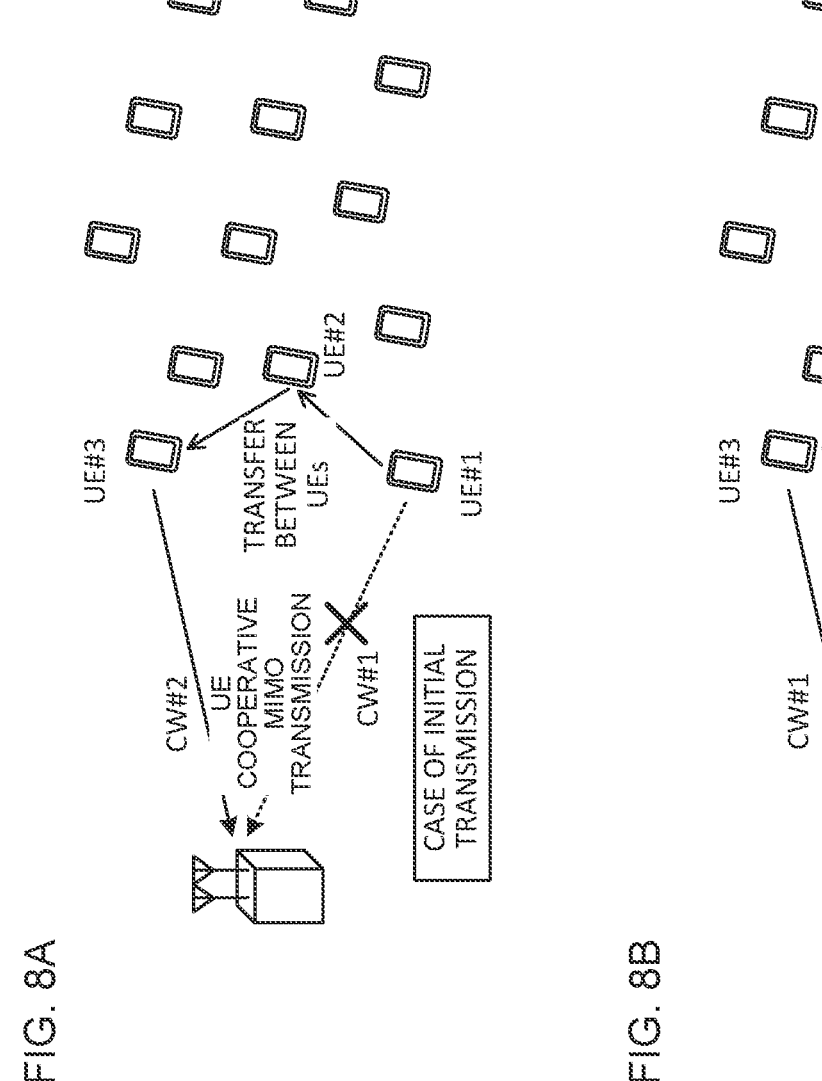
FIG. 8A and FIG. 8B are diagrams to show other examples of UL transmission control in a case of initial transmission and retransmission according to the second embodiment.
Figure 8B:
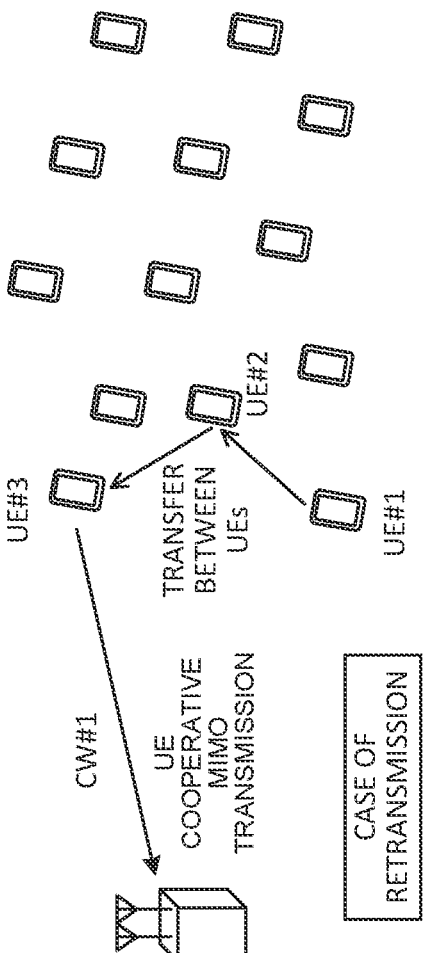

For example, in initial transmission, when an error occurs in data (for example, CW #1) not to be transferred between the UEs, the transfer path (or the UE that performs data transmission) may be changed, such that retransmission may be controlled (see FIG. 8A and FIG. 8B).

FIG. 8A shows a case in which at least a part (here, CW #2) of UL data is transferred from UE #1 to UE #3 via UE #2, and UE #1 and UE #3 are scheduled/configured to cooperate with each other and perform transmission, in the case of initial transmission. Here, a case is shown in which an error occurs in transmission of data (here, CW #1) from UE #1 to the base station.

FIG. 8B shows a case of control in which data (for example, CW #1) is not transmitted from UE #1 but CW #1 is transmitted from another UE in the case of retransmission (for example, the transmission path for retransmission is changed). When CW #2 is successfully and correctly received in the base station in the case of initial transmission, CW #2 may be controlled not to be transmitted in the case of retransmission.

When an error occurs in transmission of data (here, CW1) between UE #1 and the base station, the base station may indicate/schedule retransmission of CW #1 for UE #1 (or UE #1 to UE #3). In the case of retransmission, UE #1 may not transmit CW #1 to the base station but control another UE to transfer. When UE #1 does not receive a response signal (for example, an ACK) from the base station after transmission (for example, initial transmission) of CW #1, UE #1 may autonomously perform control to perform retransmission.

Alternatively, in the case of retransmission, control may be performed so that CW #1 is transmitted (for example, cooperatively transmitted) from another UE (UE #3 of FIG. 8B) and UE #1. In this manner, a probability that CW #1 is successfully and correctly received in the base station can be increased.

As the path for transfer of CW #1 between the UEs in the case of retransmission, the path for CW #2 in the case of initial transmission may be used. For example, when CW #2 is correctly received in the base station in the case of initial transmission, retransmission of CW #1 may be controlled using the path for CW #2 in the case of initial transmission (UE #1→UE #2→UE #3→Base station in FIG. 8A). In contrast, when an error occurs in transmission of CW #2 in the case of initial transmission, the path for CW #1/CW #2 in the case of retransmission may be changed.

Alternatively, the path for transfer of CW #1 between the UEs in the case of retransmission may be indicated based on at least one of higher layer signaling and DCI.

For example, the path in the case of retransmission may be configured using higher layer signaling (see FIG. 9A).

Note that, in FIG. 9A, the paths for transfer between the UEs in initial transmission and retransmission have different details being defined, but this is not restrictive.

Alternatively, the path in the case of retransmission may be indicated by DCI for scheduling data (for example, a PUSCH) for retransmission/for indicating assignment of resources for transfer between the UEs (see FIG. 9B). For example, "00" may be indicated by DCI for scheduling data for initial transmission/for indicating assignment of resources for transfer between the UEs for initial transmission, and "01" may be indicated by DCI for scheduling data for retransmission/for indicating assignment of resources for transfer between the UEs for initial transmission. Alternatively, the same path may be specified in the case of initial transmission and the case of retransmission.

Alternatively, a specific candidate may be specified as the path in the case of initial transmission by DCI among a plurality of candidates configured in a higher layer (see FIG. 10A), and the path in the case of retransmission may be configured using higher layer signaling in advance (see FIG. 10B). In this case, the DCI for scheduling data in the case of retransmission need not indicate a path, and thus need not include a DCI field for indicating the path. Sizes of the DCI used in the case of initial transmission and the DCI (or the DCI field) used in the case of retransmission may be different.

Third Embodiment

Whether or not transmission is performed cooperatively between the UEs (for example, whether or not cooperative MIMO transmission between the UEs is applied) or whether or not transfer between the UEs is performed may be determined based on a given condition. The following description concerns whether or not cooperative MIMO transmission between the UEs is applied; however, the present disclosure may be similarly applied to transfer between the UEs.

The UE configured with UE cooperative MIMO transmission (or transfer of data to another UE) may determine whether or not to perform cooperative transmission, based on a transmission classification/transmission type. The UE configured with UE cooperative MIMO transmission may be a UE that has transferred at least a part data of its terminal to another UE or a higher layer, or a UE configured to transmit data obtained from another UE or a higher layer by using a PUSCH of its terminal. For example, the UE may change whether or not to apply cooperative transmission between the case of initial transmission and the case of retransmission.

When data of initial transmission transmitted using cooperative transmission fails to be correctly received on a base station side (or when there is an error in the data of initial transmission), the UE may perform control to transmit (non-cooperative MIMO transmission) retransmission data without using cooperative transmission.

The UE may determine whether or not the base station has successfully and correctly received the initial transmission data, based on whether or not there is a transmission confirmation signal (for example, an ACK) transmitted from the base station or whether or not retransmission is indicated/scheduled from the base station. For example, when the UE cannot receive an ACK for initial transmission from the base station, the UE may perform control to perform retransmission. Alternatively, when the UE receives DCI for indicating/scheduling retransmission from the base station, the UE may perform control to perform retransmission. The DCI for indicating/scheduling retransmission may be DCI including the same HARQ process ID as that in initial transmission.

When cooperative transmission with another UE is not performed (for example, non-cooperative MIMO transmission is performed), one UE may transmit one or a plurality of pieces of data (for example, TBs/CWs/CBs). When non-cooperative MIMO transmission is performed, one UE may be controlled to perform transmission to the base station. Alternatively, when non-cooperative MIMO transmission is performed, data of one UE may be transmitted to the base station via a plurality of UEs, using multi-hop.

Figures 11A, 11B:
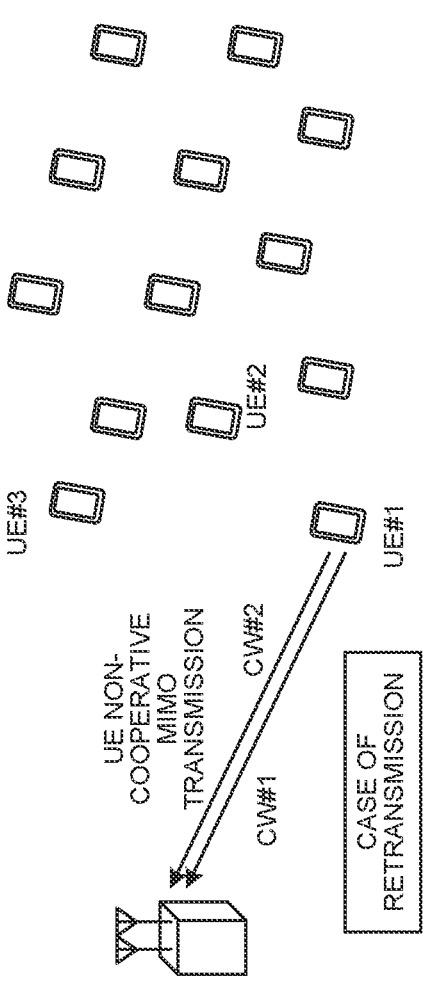
FIG. 11A and FIG. 11B are diagrams to show examples of UL transmission control according to a third embodiment.

FIG. 11A and FIG. 11B show an example of a case in which whether or not UE cooperative MIMO transmission is applied is changed in a case of first transmission (for example, initial transmission) and a case of second transmission (for example, retransmission). Here, a case is shown in which UE cooperative MIMO transmission (UE #1 and UE #3) is performed in initial transmission, and UE non-cooperative MIMO transmission is performed in retransmission. Shown is an example of retransmission operation of a case in which data (CW #2) transferred from UE #1 to another UE is not appropriately received in the base station in initial transmission.

FIG. 11A shows a case in which at least a part (here, CW #2) of UL data is transferred from UE #1 to UE #3 via UE #2, and UE #1 and UE #3 are scheduled/configured to cooperate with each other and transmit data, in the case of initial transmission. Here, a case is shown in which an error (or a transmission error) occurs in transfer from UE #2 to UE #3. Note that FIG. 11A shows a case in which UE #1 transmits CW #1 and UE #3 transmits CW #2, but this is not restrictive.

FIG. 11B shows a case in which data (here, CW #1 and CW #2) is transmitted from UE #1 to the base station without performing cooperative transmission (by applying UE non-cooperative MIMO transmission) in the case of retransmission.

FIG. 11B shows a case in which data (here, CW #1 and CW #2) is transmitted from UE #1 to the base station in the case of retransmission, but this is not restrictive. The data may be transmitted from UE #1 to the base station, with another UE being hopped. FIG. 11B shows a case in which all of data (here, CW #1+CW #2) is transmitted from UE #1 in the case of retransmission, but this is not restrictive. For example, when CW #1 is correctly received in the base station in the case of initial transmission, UE #1 may perform control to transmit CW #2 without transmitting CW #1 in the case of retransmission.

Switching of UE cooperative MIMO transmission/non-cooperative MIMO transmission in the case of retransmission may be applied based on a given condition. The given condition may be a case in which an error occurs in the data transferred to another UE (for example, the data (here, CW2) transferred from UE #1).

For example, the given condition may be a case in which an error occurs in one of communications (for example, between UE #1 and UE #2/between UE #2 and UE #3/between UE #3 and the base station in FIG. 11A) of the data (CW #2 in FIG. 11A) transferred between the UEs. Alternatively, the given condition may be a case in which an error occurs in one (for example, at least one of CW #1 and CW #2) of between the UE and the base station (between UE #1 and the base station/between UE #3 and the base station) and transfer between the UEs.

The path in the case of retransmission (for example, the path for UE non-cooperative MIMO transmission) may be configured using higher layer signaling, or may be indicated by DCI for indicating retransmission. The DCI for indicating retransmission may indicate at least one of scheduling of a PUSCH for retransmission and assignment of resources for transfer (hop) between the UEs for retransmission, for example. In FIG. 11B, as the path/resources in the case of retransmission, information related to UE #1 and the base station may be notified.

FIG. 11A and FIG. 11B show a case in which UE cooperative MIMO transmission is applied in the case of initial transmission and UE non-cooperative MIMO transmission is applied in the case of retransmission, but this is not restrictive. UE non-cooperative MIMO transmission may be applied in the case of initial transmission, and UE cooperative MIMO transmission may be applied in the case of retransmission.

As described above, by controlling a transmission method based on a transmission type (for example, initial transmission/retransmission), consecutive errors in transmission of data can be reduced, and throughput can be enhanced.

Whether or not UE cooperative MIMO transmission (or UE non-cooperative MIMO transmission) is applied in each transmission (for example, initial transmission/retransmission) may be indicated for the UE, using higher layer signaling/DCI. The UE may determine the transmission method to be used, based on the higher layer signaling/the DCI.

The UE may perform control to perform UE non-cooperative MIMO transmission when being scheduled by first DCI. The UE may perform control to perform UE cooperative MIMO transmission when being scheduled by second DCI.

The first DCI may be a specific DCI format. The specific DCI format may be a format (for example, DCI format 0_0) having a relatively small DCI size. Note that the DCI format is not limited to this. Alternatively, the first DCI may be DCI received/detected in a common search space/common control resource set. The first DCI may be referred to as fallback DCI.

The second DCI may be a format (for example, DCI format 1_1/0_2) having a relatively large DCI size. Note that the DCI format is not limited to this. Alternatively, the second DCI may be DCI received/detected in a UE-specific search space/UE-specific control resource set. The second DCI may be referred to as non-fallback DCI (normal DCI).

Figures 12A, 12B:
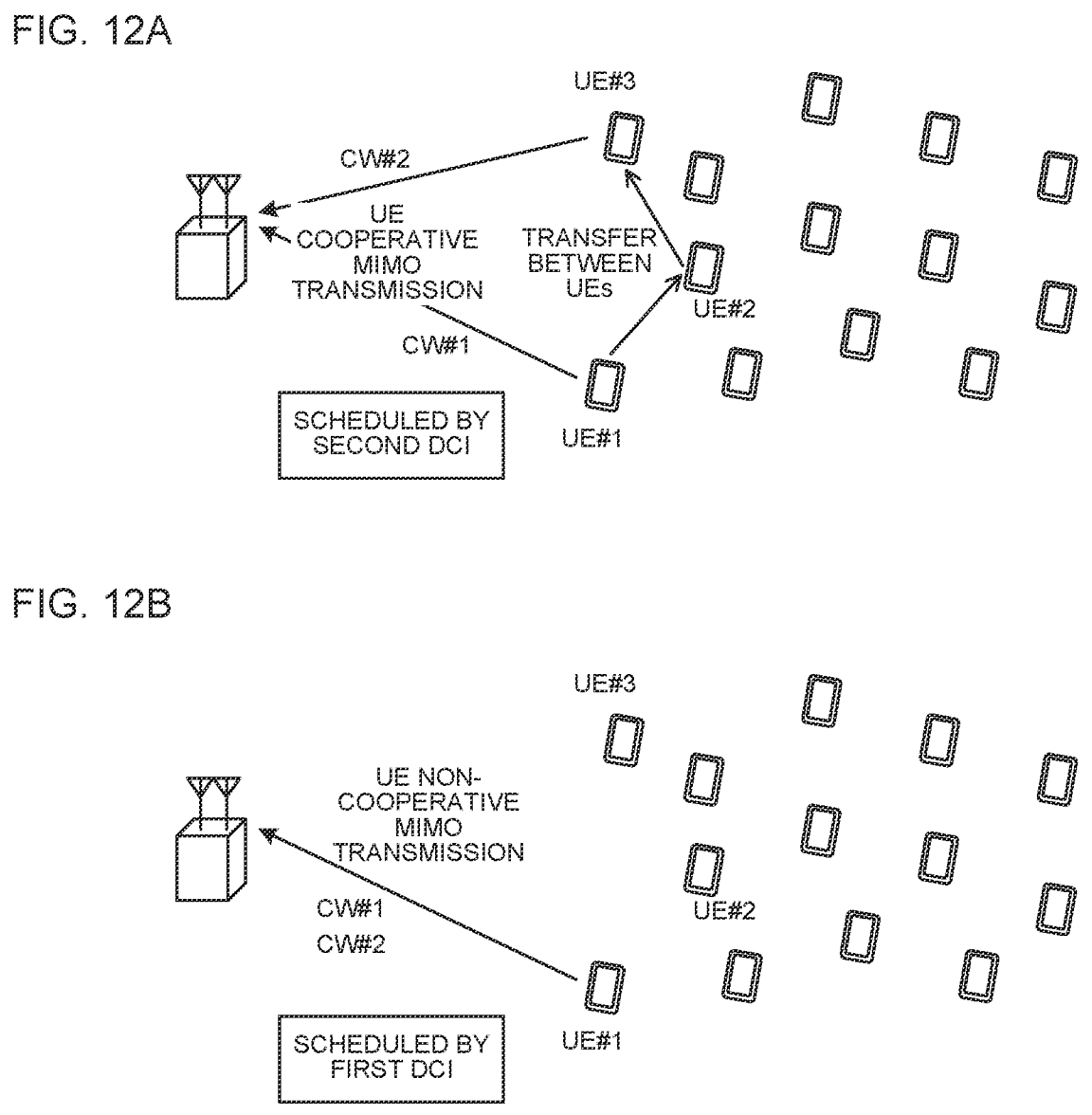

FIG. 12A and FIG. 12B show an example of a case in which whether or not UE cooperative MIMO transmission is applied is changed based on a notification (here, DCI) from the base station. Here, a case is shown in which UE cooperative MIMO transmission (UE #1 and UE #3) is performed in the first transmission (for example, initial transmission) scheduled by the second DCI, and UE non-cooperative MIMO transmission is performed in the second transmission (for example, retransmission) scheduled by the first DCI.

For example, the base station may schedule UE cooperative MIMO transmission for initial transmission using the second DCI, and when an error occurs in the initial transmission, the base station may schedule UE non-cooperative MIMO transmission for retransmission using the first DCI.

FIG. 12A shows a case in which, when UL transmission is scheduled by the second DCI (for example, in the case of initial transmission), UE #1 performs control to cooperate with another UE (here, UE #3) and perform UL transmission. Here, a case is shown in which at least a part (here, CW

2) of UL data is transferred from UE #1 to UE #3 via UE #2, and UE #1 and UE #3 cooperate with each other and perform transmission.

FIG. 12B shows a case in which, when UL transmission is scheduled by the first DCI (for example, in the case of retransmission), UE #1 transmits data (here, CW #1 and CW #2) from UE #1 to the base station without performing cooperative transmission (by applying UE non-cooperative MIMO transmission).

FIG. 12B shows a case in which data (here, CW #1 and CW #2) is transmitted from UE #1 to the base station, but this is not restrictive. The data may be transmitted from UE #1 to the base station, with another UE being hopped. FIG. 12B shows a case in which all of data (here, CW #1+CW #2) is transmitted from UE #1 in the case of retransmission, but this is not restrictive.

The size of the first DCI (for example, the fallback DCI) and the size of the second DCI (for example, the normal DCI) may be different. Scheduling of MIMO transmission (for example, SU-MIMO transmission) may be supported using the first DCI. In this case, as the first DCI, existing DCI format 0_1/0_2 may be used. As the second DCI, another DCI format may be used. Such another DCI format (for example, DCI format 0_3) may be a DCI format including a field for specifying a path indication between the UEs, for example.

Figure 13:
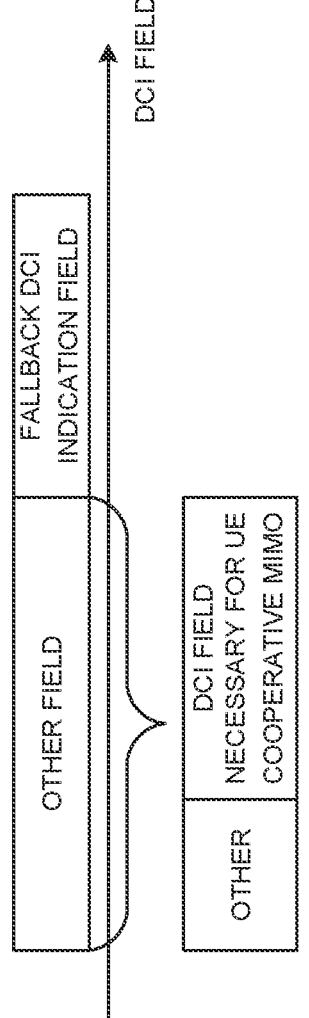
FIG. 13 is a diagram to show an example of a DCI field according to the third embodiment.

The size of the first DCI (for example, the fallback DCI) and the size of the second DCI (for example, the normal DCI) may be the same. The first DCI and the second DCI may be used as new DCI formats (for example, DCI format 0_3). In this case, a fallback DCI indication field may be included in a new DCI field (see FIG. 13).

The fallback DCI indication field may be defined by 1 bit ("0" for UE non-cooperative MIMO, and "1" for UE cooperative MIMO), for example. The UE may determine which to apply among UE cooperative MIMO transmission and UE non-cooperative MIMO transmission, based on the fallback DCI indication field. In other field, a DCI field necessary for UE cooperative MIMO is included, and with the DCI field, for example, information related to the transmission path between the UEs/information related to the resources to be assigned between the UEs may be notified.

When scheduling of UE non-cooperative MIMO transmission is performed using the fallback DCI, a DCI field necessary for UE cooperative MIMO transmission is unnecessary. In this case, the UE may ignore the field for UE cooperative MIMO transmission included in the fallback DCI, or may make a different interpretation of bits in the field and use the bits for another indication. In this manner, even when a field for UE cooperative MIMO transmission is included in the fallback DCI, the field can be effectively used.

Alternatively, the fallback DCI indication field may not be included in the DCI, and the UE may determine which to apply among UE cooperative MIMO transmission and UE non-cooperative MIMO transmission, based on a given parameter corresponding to the DCI. The given parameter may be a search space/control resource set/RNTI corresponding to the detected DCI.

Fourth Embodiment

The UE may perform control to perform synchronization between the UEs/between the antenna ports, based on a given synchronization signal.

When the UE performing UE cooperative transmission receives a given synchronization signal, the UE may control synchronization with another UE/synchronization with the antenna port of another UE, based on the given synchronization signal. In the present disclosure, the UE performing UE cooperative transmission may be interpreted as a UE configured with a given higher layer parameter (for example, a parameter for UE cooperative MIMO), or a UE supporting UE cooperative transmission.

Figure 14:
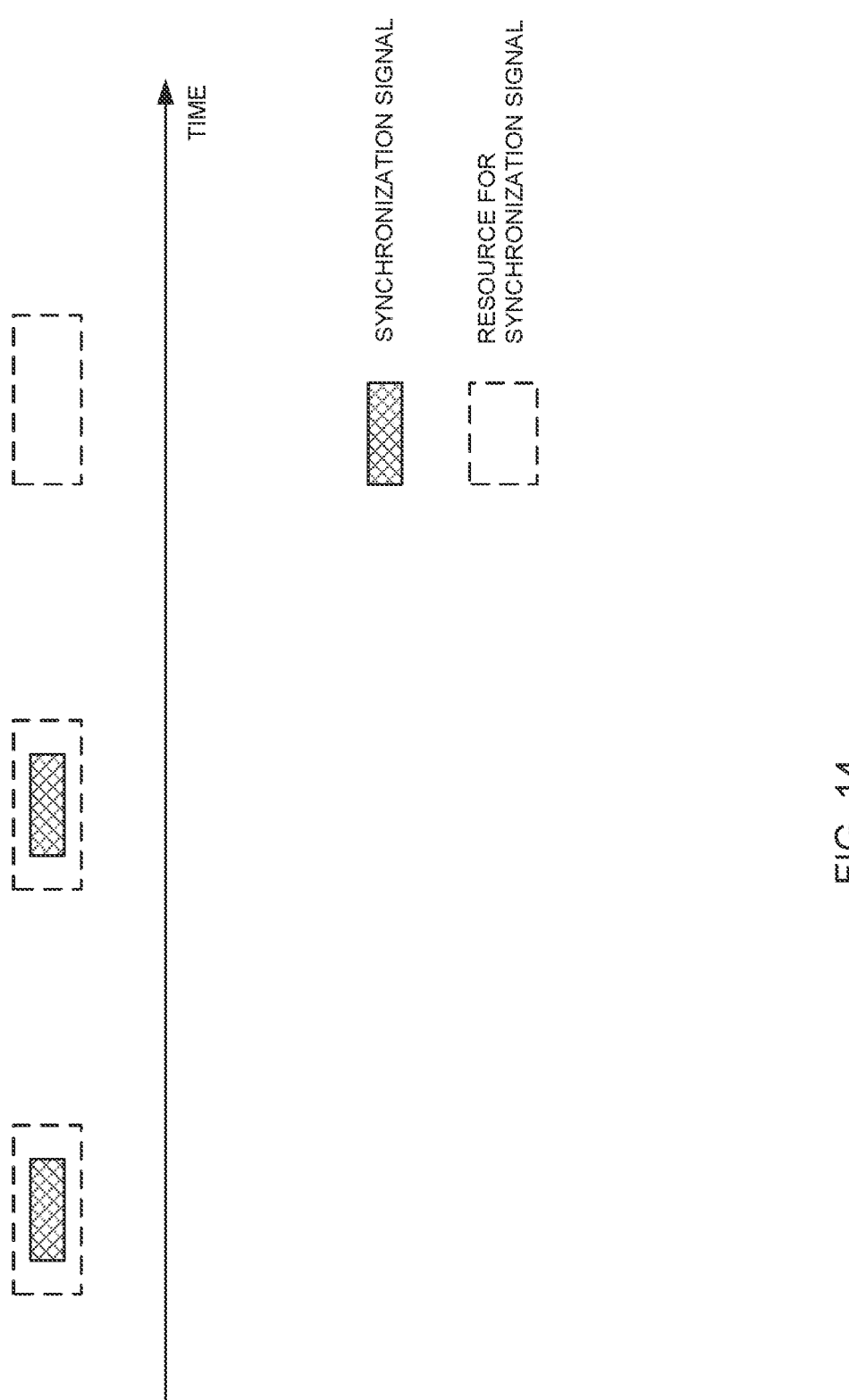
FIG. 14 is a diagram to show an example of a synchronization signal in UE cooperative MIMO according to a fourth embodiment.

The given synchronization signal may be periodically transmitted/configured, or may be aperiodically transmitted/configured. The given synchronization signal may be transmitted in a resource or an occasion (see FIG. 14). The resource may be interpreted as a transmission resource, a reception resource, or a measurement source. The occasion may be interpreted as a transmission occasion, a reception occasion, or a measurement occasion.

The resource/occasion of the synchronization signal may be notified/configured from the base station to the UE, using higher layer signaling or the like. The UE may control reception of the given synchronization signal, based on the resource/occasion notified from the base station. The given synchronization signal may be constantly transmitted in a configured resource/occasion, or may be transmitted in a part of resources/occasions out of a plurality of configured resources/occasions (or resource candidates/occasion candidates).

When the UE receives the synchronization signal, the UE may perform control to perform synchronization (time/frequency synchronization) after a given time period has elapsed. The given time period may be defined in a specification, may be notified/configured from the base station to the UE using higher layer signaling, or may be determined based on reported UE capability information.

The UE may control synchronization using a plurality of synchronization signals, or may control synchronization using one synchronization signal. For example, when the UE uses a plurality of synchronization signals, the UE may apply averaging processing to reception results of a plurality of times of synchronization signals previously received, and control synchronization. When the UE uses one synchronization signal, the UE may control synchronization each single time the UE receives the synchronization signal.

The given synchronization signal may be transmitted from the network (for example, the base station). Alternatively, the given synchronization signal may be transmitted from another UE/the antenna port of another UE. Another UE may be a UE to cooperate with or a UE to be paired with in a case of performing cooperative transmission/cooperative reception between the UEs/between the antenna ports.

As the synchronization signal, a channel/signal (for example, an SSB/TRS/CSI-RS) of existing systems (for example, Rel. 16 or earlier versions) may be applied, or a new channel/signal may be applied. The synchronization signal used for synchronization between the base station and the UE and the synchronization signal used for synchronization between a plurality of UEs may be configured to be common, or may be configured separately.

When the UE receives/detects the synchronization signal in the resource/occasion used for transmission of the synchronization signal, the UE may determine timing of cooperative transmission/cooperative reception between the UEs/between the antenna ports, using the received/detected synchronization signal.

The resource/occasion of the synchronization signal may be a resource/occasion for synchronization between the base station and the UE, or may be a resource/occasion for synchronization between the UEs (between the antenna ports). Alternatively, both of the resource/occasion for synchronization between the base station and the UE and the resource/occasion for synchronization between the UEs (between the antenna ports) may be configured.

As described above, by performing synchronization between a given UE (or an antenna port of a given UE) and another UE (or an antenna port of another UE) using the synchronization signal, UE cooperative MIMO can be appropriately controlled.

Fifth Embodiment

The UE may perform control to share given information with another UE to which UE cooperative MIMO is applied. The given information may be at least one of transmission data, control information, and channel state information. The transmission data may be interpreted as transmission data information, UL data, DL data, a UL-SCH, or a DL-SCH.

The following description will take an example of a case in which transmission data (or a PUSCH/UL data/UL-SCH) is transmitted in UE cooperative MIMO; however, the present disclosure can also be similarly applied to a case in which another UL signal/UL channel (for example, uplink control information/PUCCH) is cooperatively transmitted.

Figure 15:
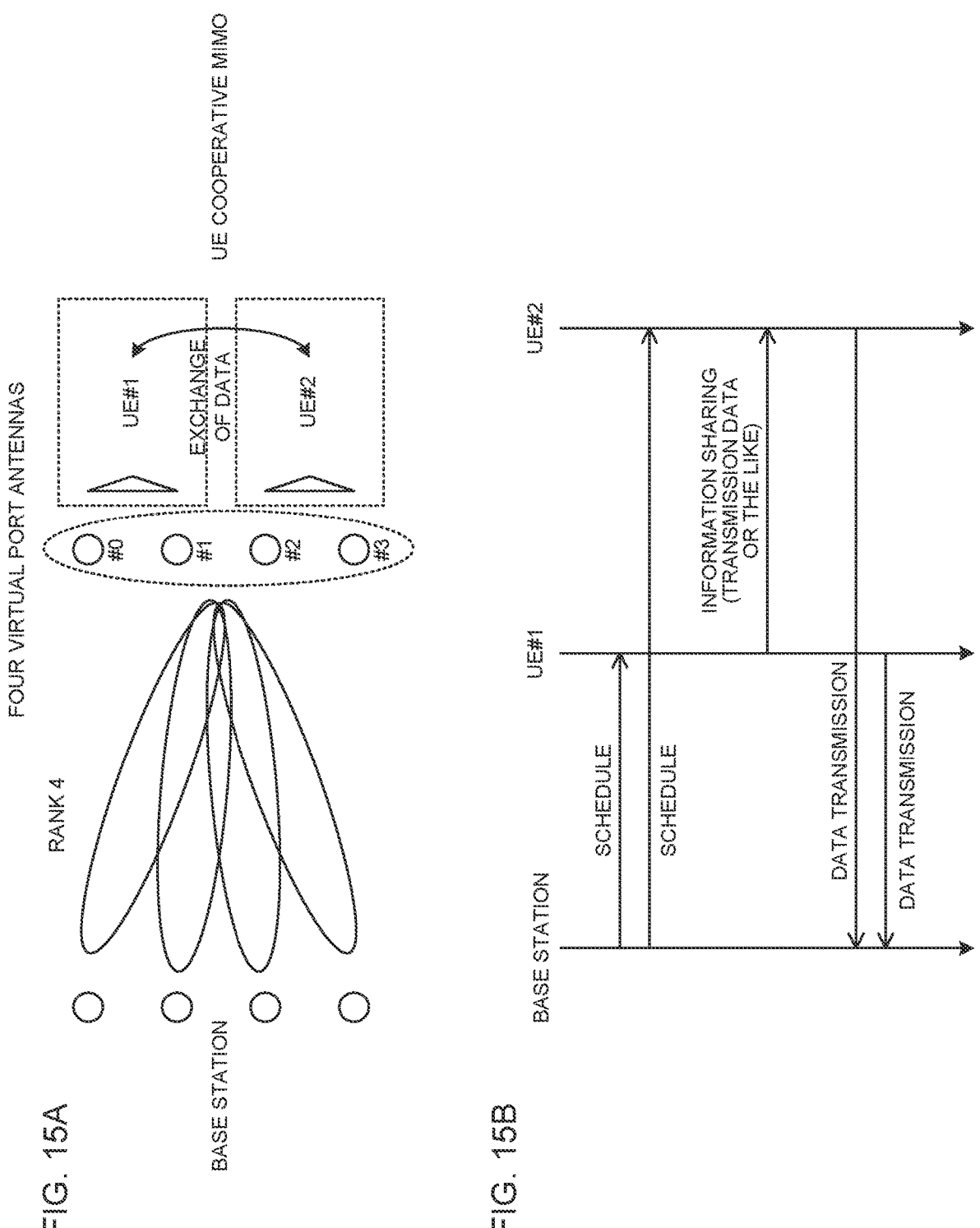
FIG. 15A and FIG. 15B are diagrams to show examples of communication control in UE cooperative MIMO according to the fifth embodiment.

FIG. 15A and FIG. 15B show an example of a case in which a first UE (UE #1) and a second UE (UE #2) cooperate with each other and perform UL transmission. FIG. 15A shows a case in which UE #1 uses antenna ports #0 and #1 and UE #2 uses antenna ports #2 and #3, and transmission is performed using four virtual port antennas. Note that the number of antenna ports of each UE (here, two for each), the number of ranks/number of layers (here, four) used for cooperative transmission, and the number of UEs (here, two) performing cooperative transmission are not limited to this.

In FIG. 15B, the base station transmits information related to a UL transmission indication to the UE. In the present disclosure, the information related to a UL transmission indication may be interpreted as information related to scheduling of UL transmission, information related to a trigger of UL transmission, a UL grant, and a DL assignment (if cooperative reception is performed in the DL).

Here, a case is shown in which transmission data (for example, a part of transmission data) of UE #1 is also transmitted from UE #2. In this case, information related to transmission data of UE #1 may be reported to/notified to/transferred to/subjected to sharing of information with (hereinafter also referred to as transfer/information sharing) UE #2. In other words, the information related to transmission data of UE #1 is shared between UE #1 and UE #2.

The transmission data of UE #1 may be interpreted as UL data/UL-SCH corresponding to UE #1, or UL data/UL-SCH for UE #1. Note that the UL data/UL-SCH may be interpreted as UL control information/UCI.

With given information being transmitted/notified from UE #1 to UE #2, information may be shared between UE #1 and UE #2. To share information, existing communication methods, such as an unlicensed band (or a shared spectrum), WiFi, and Bluetooth (trademark), may be applied. For example, in FIG. 15B, UE #1 may transfer/perform information sharing of given information to/with UE #2, using a higher layer. In other words, higher layer signaling may be used in communication between the UEs.

Alternatively, information sharing may be shared between UE #1 and UE #2 as a periodic report configured by the base station. Alternatively, information sharing may be shared between UE #1 and UE #2 as an aperiodic report triggered from the base station. Alternatively, information sharing may be autonomously shared between UE #1 and UE #2. Alternatively, each UE may be capable of indicating/instructing another UE to report or share given information.

Alternatively, the following control may be performed: information is shared between the UEs using a channel for D2D or the like based on a specification (for example, a physical layer specification/RAN1 specification) supported in D2D, and cooperative transmission is performed between a plurality of UEs using the shared information.

FIG. 15B shows a case in which transmission data (for example, a part of transmission data) of UE #1 is transmitted from UE #2, but this is not restrictive. Transmission data (for example, a part of transmission data) of UE #2 may be transmitted from UE #1. In this case, information may be shared/provided from UE #2 to UE #1 (see FIG. 16).

Figure 16:
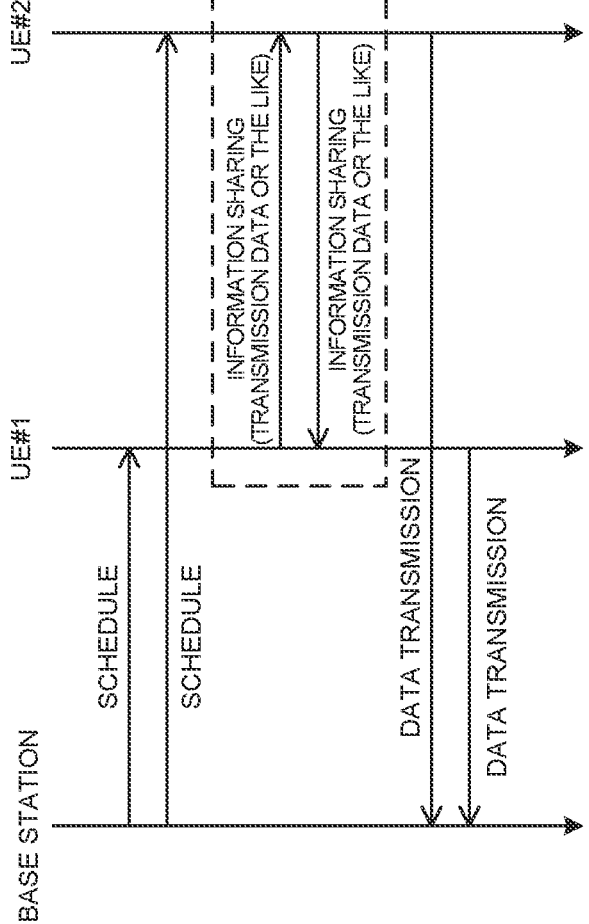
FIG. 16 is a diagram to show another example of communication control in UE cooperative MIMO according to a fifth embodiment.

FIG. 16 shows a case in which information related to the transmission data (for example, a part of transmission data) of UE #1 is transferred from UE #1 to UE #2, and information related to the transmission data (for example, a part of transmission data) of UE #2 is transferred from UE #2 to UE #1. A transfer method of transmission data from UE #2 to UE #1 may be controlled similarly to a transfer method of transmission data from UE #1 to UE #2.

As described above, by performing cooperative transmission between a plurality of UEs after information is shared between the UEs based on an indication from the base station, cooperative transmission can be appropriately controlled.

Sixth Embodiment

When transmission/reception is performed using UE cooperative MIMO, control may be performed so that a given parameter/configuration is shared between the UEs/between the antenna ports. In this case, a given parameter/configuration (for example, a first parameter/configuration) may be configured to be common between the UEs/between the antenna ports. On the other hand, another parameter/configuration (for example, a second parameter/configuration) may be separately configured (for example, so as to be different) between the UEs/between the antenna ports.

The given parameter/configuration may be at least one of a configuration of a demodulation reference signal (for example, a DMRS configuration), the number of layers/number of ranks (for example, the number of MIMO layers/number of MIMO ranks), a transmission signal resource, and a DMRS resource.

The DMRS configuration may be at least one of a DMRS symbol number in the time direction, whether or not an additional DMRS is inserted, and a DMRS type (for example, type 1 or type 2) in the frequency direction.

The transmission signal resource (or resource) may be at least one of time, frequency, CDM/orthogonal code, a sequence number, and a cyclic shift number. The DMRS resource may be at least one of time, frequency, CDM/orthogonal code, a sequence number, a cyclic shift number, a Comb index (for example, a Comb index), and a CDM group index (for example, a CDM group index). Information related to the transmission signal resource/DMRS resource may be dynamically notified from the base station to the UE, using DCI at the time of transmission indication (or scheduling).

The network (for example, the base station) may configure the given parameter/configuration for a given UE, using higher layer/physical layer control information (for example, DCI). The given UE may be a plurality of UEs performing cooperative transmission, or may be a part of UEs among the UEs performing cooperative transmission (for example, UEs corresponding to data to be transmitted (or transmission data transfer source UEs)). The given parameter/configuration may be configured (for example, for cooperative transmission) separately from regular transmission (for example, transmission between the UE and the base station).

When the UE is configured with the given parameter/configuration by higher layer/physical layer control information (for example, DCI), the UE may assume that the same details are also configured in a UE/antenna port (for example, a UE/antenna port to be paired with) performing cooperative transmission. Alternatively, the UE may assume that the same details are configured regarding a part of parameters/configurations, and different details are configured regarding other parameters/configurations.

Alternatively, when the UE is configured with the given parameter/configuration, the UE may give notification of/indicate the same (or different) details to a UE/antenna port to be paired with. As the notification to the UE/antenna port to be paired with, a method used in information sharing between the UEs in a second aspect may be applied.

For example, the DMRS symbol number and the like may be configured to be the same between a plurality of UEs (for example, between UE #1 and UE #2), and the DMRS Comb index/CDM group index and the like may be separately configured (for example, so as to be different) between a plurality of UEs. The transmission signal resource may be configured in an overlapping manner between a plurality of UEs, or may be separately configured (for example, so as to be different).

FIG. 17 is a diagram to show an example of resource configuration/resource assignment for UE #1 and UE #2 cooperatively performing transmission. Here, a case is shown in which UE #1 performs transmission using antenna ports #0 and #1, and UE #2 performs transmission using antenna ports #2 and #3. A case is shown in which UE #1 and UE #2 are configured with the same details as the first parameter/configuration (here, the DMRS symbol), and are configured with different details as the second parameter/configuration (here, the Comb index). Note that the details of the first parameter/configuration and the second parameter/configuration are not limited to this.

FIG. 17 shows a case in which the transmission signal resources of UE #1 and UE #2 overlap, but this is not restrictive, and the transmission signal resources of UE #1 and UE #2 need not overlap (or may partially overlap).

As described above, by configuring a part of parameters to be common and separately configuring other parameters for a plurality of UEs performing UE cooperative MIMO, UE cooperative MIMO transmission can be appropriately controlled.

Seventh Embodiment

When transmission/reception is performed using UE cooperative MIMO, the base station transmits information related to scheduling to at least one UE among a plurality of UEs cooperatively performing transmission, using given DCI.

The information related to scheduling may include at least one of frequency resources, time resources, transmission timing, and reception timing used for transmission/reception. The information related to scheduling may be interpreted as information related to a UL transmission indication or information related to a DL reception indication.

Transmission of the information related to scheduling may be controlled based on at least one of the following aspect 4-1 to aspect 4-3. Which is to be applied among aspect 4-1 to aspect 4-3 may be defined in a specification, or may be configured in a switching manner using higher layer signaling/DCI or the like. Configurable aspects may be limited, based on capability information of the UE (or capability information reported from the UE).

<Aspect 4-1>

The DCI used for UL transmission indication/scheduling may be UE-specific DCI. In other words, the UE may be scheduled by DCI dedicated to each UE (see FIG. 18A). The UE cooperates with another UE and performs transmission of data (for example, cooperative MIMO transmission between the UEs), using scheduling information addressed to its terminal.

Figures 18A, 18B:
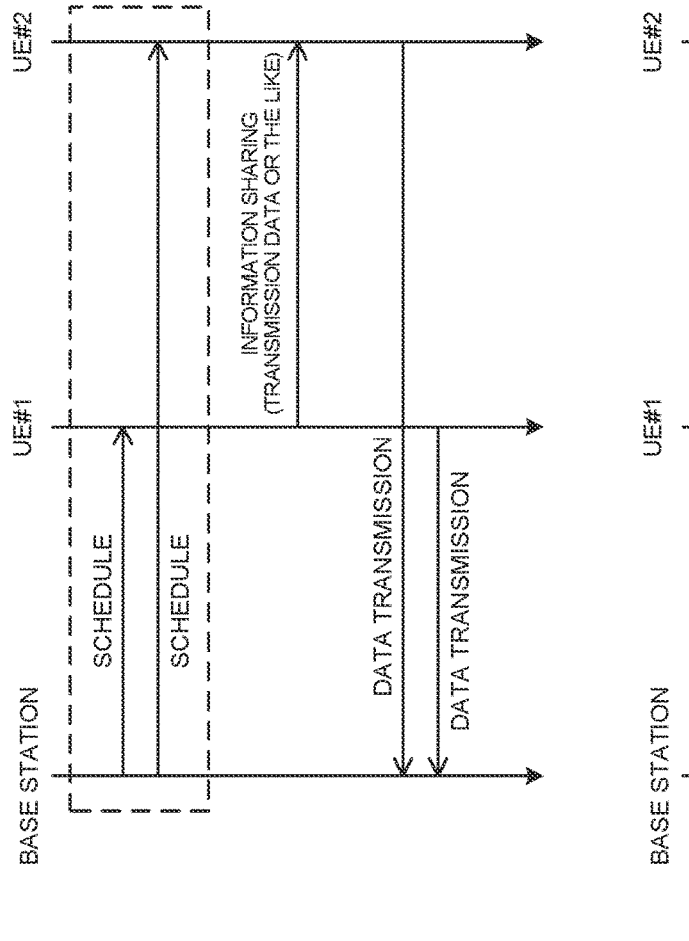
FIG. 18A and FIG. 18B are diagrams to show examples of communication control in UE cooperative MIMO according to a seventh embodiment.

In FIG. 18A, the base station transmits scheduling information to UE #1 and UE #2. Here, the base station may transmit, to UE #1, the information related to scheduling, using DCI (for example, UE #1-specific DCI) corresponding to UE #1. The base station may transmit, to UE #2, the information related to scheduling, using DCI (for example, UE #2-specific DCI) corresponding to UE #2.

UE #1 notifies (information sharing) UE #2 of information such as transmission data. For example, UE #1 may transfer/perform information sharing of information related to transmission data transmitted using UE #2 (or the antenna port of UE #2) to/with UE #2.

UE #1/UE #2 cooperates with each other and performs transmission, based on the information related to scheduling received from the base station. Here, a case is shown in which UL data corresponding to UE #1 is transmitted from UE #1 (or the antenna port of UE #1) and UE #2 (or the antenna port of UE #2). Note that cooperatively transmitted information is not limited to the UL data (or the UL-SCH), and may be UL control information (for example, UCI).

As described above, by notifying each UE of the information related to scheduling using UE-dedicated DCI, scheduling can be flexibly controlled for each UE.

<<Variations>>

FIG. 18A shows a case in which the information such as transmission data is notified (information sharing) from UE #1 to UE #2, but this is not restrictive. The information such as transmission data may be notified (information sharing) from UE #2 to UE #1 as well (see FIG. 18B).

FIG. 18B shows a case in which first scheduling information is notified from the base station to UE #1, and second scheduling information is notified to UE #2. Pieces of scheduling information #1 and #2 may be included in at least one (for example, both) of information related to resources used for transmission of information (for example, information sharing 1) notified from UE #1 to UE #2 and information related to resources used for transmission of information (for example, information sharing 2) notified from UE #2 to UE #1.

<Aspect 4-2>

The DCI used for UL transmission indication/scheduling may be transmitted to only a part of UEs among a plurality of UEs. In other words, the information related to scheduling may be notified using UE-dedicated DCI to only a part of UEs (see FIG. 19A). In the information related to scheduling, not only the information related to scheduling for the UE to which the DCI is transmitted but also the information related to scheduling for another terminal may be included.

Figures 19A, 19B:
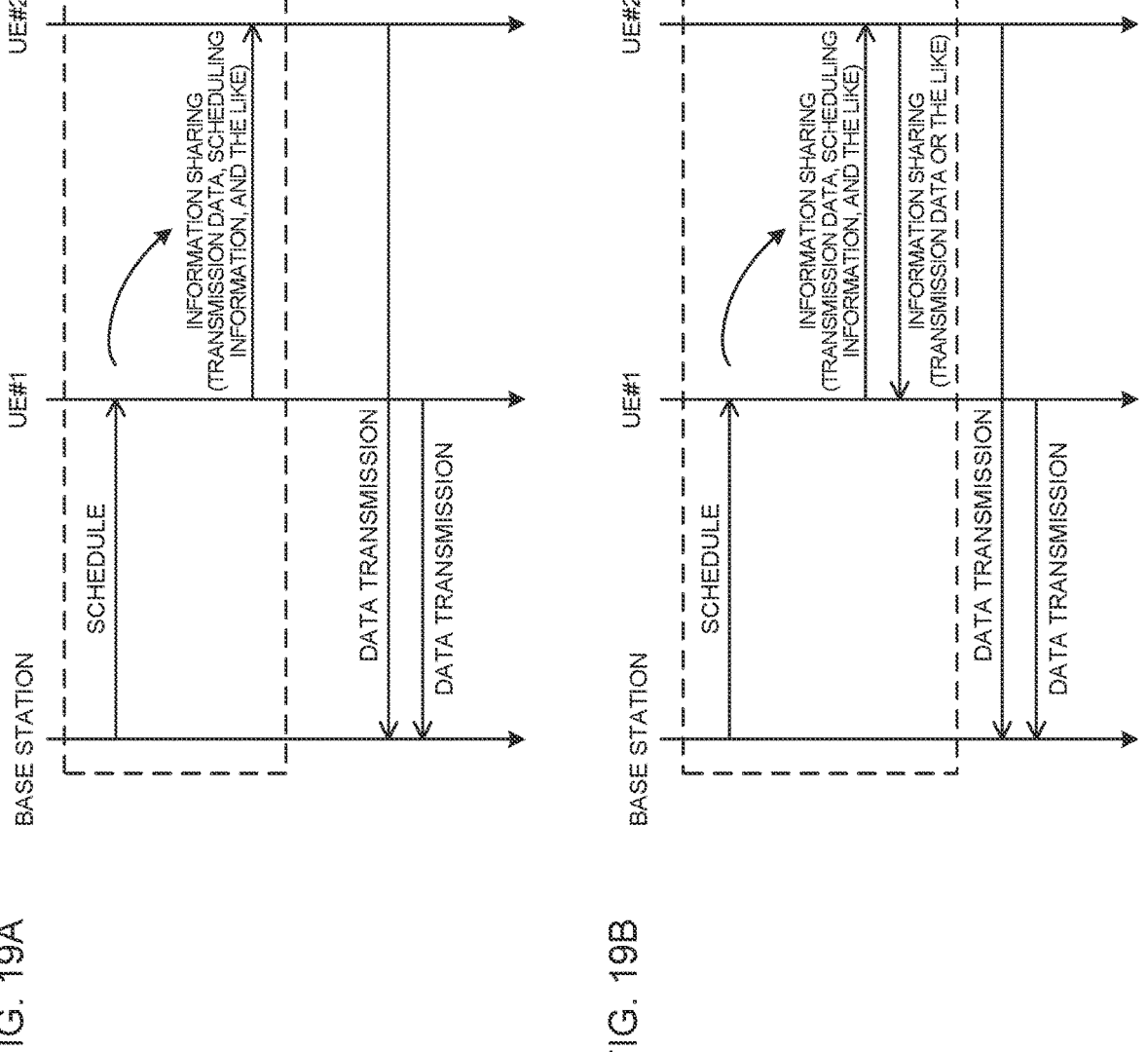
FIG. 19A and FIG. 19B are diagrams to show other examples of communication control in UE cooperative MIMO according to the seventh embodiment.

In FIG. 19A, the base station transmits the scheduling information to UE #1. Here, the base station may transmit the information related to scheduling to UE #1, using DCI subjected to CRC scrambling with an RNTI (for example, a C-RNTI) corresponding to UE #1. In the DCI, the information related to scheduling for UE #1 and the information related to scheduling for UE #2 may be included.

UE #1 may notify UE #2 of the information related to scheduling of UE #2 as a part of information sharing between the UEs. UE #2 may transmit UL data (for example, UL data notified from UE #1) using cooperative MIMO between the UEs, based on the acquired scheduling information. Note that cooperatively transmitted information is not limited to the UL data (or the UL-SCH), and may be UL control information (for example, UCI).

As described above, by notifying only a part of UEs of the information related to scheduling using DCI, increase of the number of DCIs to be transmitted can be reduced.

<<Variations>>

FIG. 19A shows a case in which the information such as transmission data is notified (information sharing) from UE #1 to UE #2, but this is not restrictive. The information such as transmission data may be notified (information sharing) from UE #2 to UE #1 as well (see FIG. 19B).

In FIG. 19B, at least one (for example, both) of information related to resources used for transmission of information (for example, information sharing 1) notified from UE #1 to UE #2 and information related to resources used for transmission of information (for example, information sharing 2) notified from UE #2 to UE #1 may be included in the scheduling information notified from the base station to UE #1.

<Aspect 4-3>

The DCI used for UL transmission indication/scheduling may be DCI (for example, group-common DCI) common to a plurality of UEs. In other words, the information related to scheduling may be notified to a plurality of UEs (for example, UE #1 and UE #2), using the group-common DCI (see FIG. 20A).

Figures 20A, 20B:
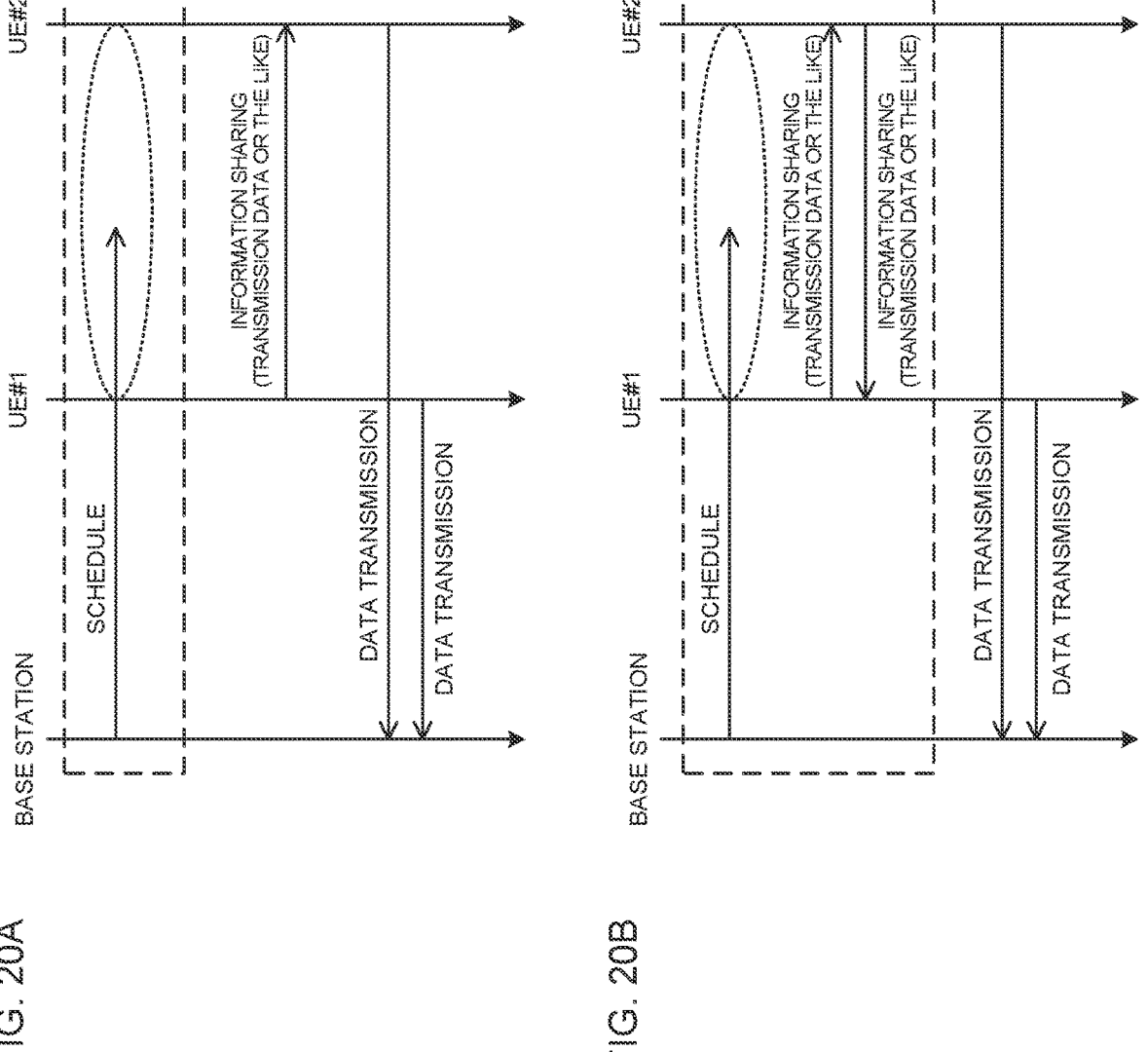
FIG. 20A and FIG. 20B are diagrams to show other examples of communication control in UE cooperative MIMO according to the seventh embodiment.

In FIG. 20A, the base station transmits the scheduling information to UE #1 and UE #2. Here, the base station may transmit the information related to scheduling to a plurality of UEs (for example, a pair of UE #1 and UE #2), using DCI subjected to CRC scrambling with a common RNTI. In the DCI, the information related to scheduling for UE #1 and the information related to scheduling for UE #2 may be included.

Each UE may acquire the information related to scheduling addressed to its terminal from the group-common DCI. The common RNTI for a plurality of UEs may be notified/configured from the base station to the UE using higher layer signaling or the like.

UE #1 notifies (information sharing) UE #2 of information such as transmission data. For example, UE #1 may transfer/perform information sharing of information related to transmission data transmitted using UE #2 (or the antenna port of UE #2) to/with UE #2.

UE #1/UE #2 cooperates with each other and performs transmission, based on the information related to scheduling received from the base station. Here, a case is shown in which UL data corresponding to UE #1 is transmitted from UE #1 (or the antenna port of UE #1) and UE #2 (or the antenna port of UE #2). Note that cooperatively transmitted information is not limited to the UL data (or the UL-SCH), and may be UL control information (for example, UCI).

As described above, by notifying a plurality of UEs of the information related to scheduling using common DCI, the DCI need no longer be separately transmitted to each UE.

<<Variations>>

FIG. 20A shows a case in which the information such as transmission data is notified (information sharing) from UE #1 to UE #2, but this is not restrictive. The information such as transmission data may be notified (information sharing) from UE #2 to UE #1 as well (see FIG. 20B).

In FIG. 20B, at least one (for example, both) of information related to resources used for transmission of information (for example, information sharing 1) notified from UE #1 to UE #2 and information related to resources used for transmission of information (for example, information sharing 2) notified from UE #2 to UE #1 may be included in the scheduling information notified from the base station to UE #1 and UE #2.

In aspect 4-1, each UE may assume that scheduling (for example, resource control or the like) of UL data (or UL-SCH) or a PUSCH transmitted by its terminal is performed with DCI addressed to its terminal.

In aspect 4-2/aspect 4-3, UE #1 may receive control information addressed to UE #2. In this case, control information addressed to each UE can be transmitted using one DCI.

When the control signal addressed to each UE (here, UE #1 and UE #2) is transmitted using one DCI, a UE-dedicated DCI field may be configured in the DCI (option 4-1). Alternatively, a UE-common DCI field may be configured in the DCI, and a different value may be notified to each UE (option 4-2).

<<Option 4-1>>

Figure 21A:
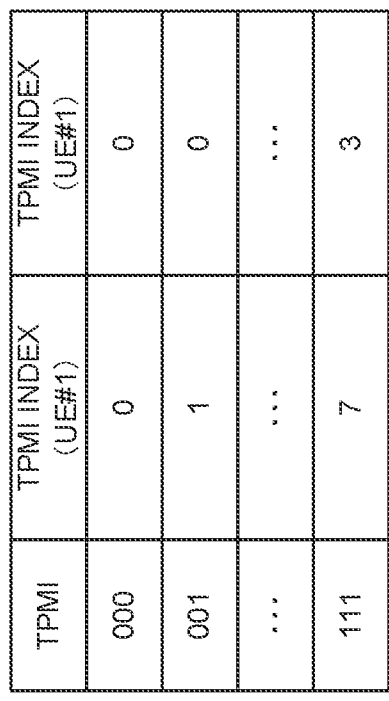
FIG. 21A and FIG. 21B are diagrams to show examples of DCI used in UE cooperative MIMO according to the seventh embodiment.

In one DCI, a UE-dedicated DCI field may be defined (see FIG. 21A). FIG. 21A shows a case in which a TPMI field is configured for each UE in the DCI. For example, in existing DCI fields, the TPMI field may be enhanced and a field allowing indication of a different TPMI for each UE may be configured.

The DCI field for each UE may be only a given (or a given type of) DCI field. In a field in which the UE-dedicated DCI field is not configured, a common value may be assumed between the UEs (or applied to be common between the UEs).

The DCI field configured to be dedicated to each UE may be a field related to at least one of a precoder for UL MIMO, rank indication, UL beam indication (for example, a TPMI/SRI), and a TPC command (for example, a TPC command for the PUSCH).

Alternatively, when the Comb index of the DMRS (or the CDM group index) is indicated by DCI, a field related to the DMRS Comb index (or the CDM group index) may be configured to be dedicated to each UE.

Alternatively, when indication of different resources between the UEs is supported, a field related to time resources/frequency resources may be configured to be dedicated to each UE.

The DCI field configured to be the same/common for each UE may be a DCI format indicator field, a timing indicator field, or the like.

<<Option 4-2>>

Figure 21B:
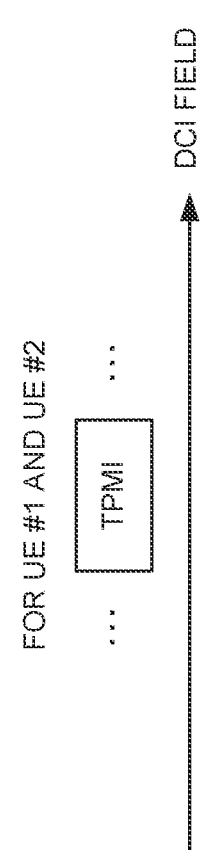

A different value may be notified to each UE in a UE-common DCI field (see FIG. 21B). For example, information for the code point (or each bit value of the DCI field) of each DCI may be configured for each UE, using higher layer signaling or the like.

FIG. 21B shows a case in which the TPMI field corresponding to UE #1 and UE #2 is configured to be common in the DCI, and correspondence between the code point and the TPMI index in the TPMI field is configured separately for each UE. In this manner, owing to the common TPMI field, a different TPMI index can be specified for each UE.

<DCI Format>

A given DCI format may be defined for UL transmission (for example, PUSCH transmission) cooperatively transmitted between the UEs. Alternatively, a given DCI format may be defined for resource assignment/scheduling used for signal transmission (for example, information sharing) between the UEs. The given DCI format may be configured through a different interpretation of bits in an existing DCI format, for example.

For example, the given DCI format may include at least one of a field used for cooperatively transmitted UL transmission (for example, PUSCH transmission) and a field for indicating resources used for signal transmission between the UEs (for example, information sharing between the UEs).

Figure 22:
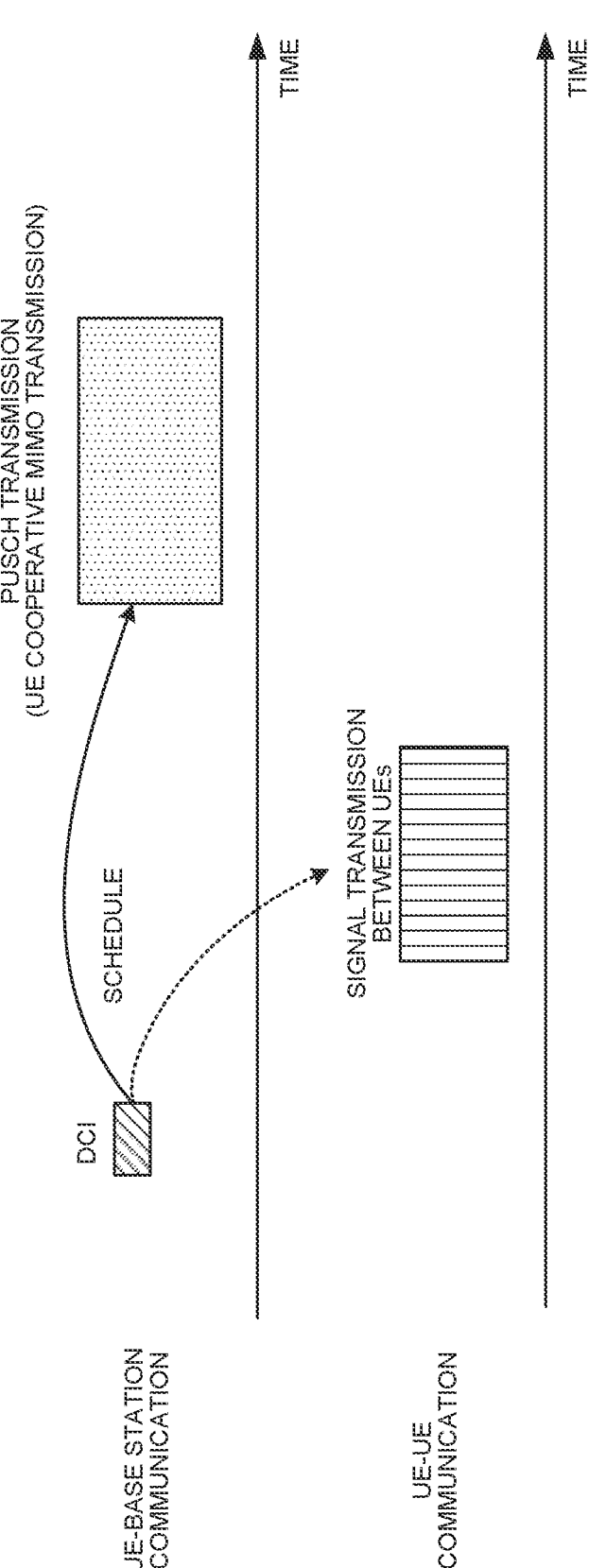
FIG. 22 is a diagram to show another example of communication control in UE cooperative MIMO according to the seventh embodiment.

The base station may indicate at least one (for example, both) of scheduling of PUSCH transmission (for example, UE cooperative PUSCH transmission) and a condition/scheduling (for example, resource assignment or the like) of signal transmission between the UEs in communication between the UEs, using a given DCI format (see FIG. 22).

A field used for PUSCH transmission (for example, UE cooperative PUSCH transmission) may be a field related to at least one of a precoder for UL MIMO, rank indication, UL beam indication (for example, a TPMI/SRI), and a TPC command (for example, a TPC command for the PUSCH).

Alternatively, when the Comb index of the DMRS (or the CDM group index) is indicated by DCI, a field related to the DMRS Comb index (or the CDM group index) may be configured.

Alternatively, when indication of different resources between the UEs is supported, a field related to time resources/frequency resources may be configured.

The field for indicating resources used for signal transmission between the UEs may be a field related to time resources/frequency resources, or may be a field related to the TPC command. The field related to time resources/frequency resources may be configured when indication of different resources between the UEs is supported. The field related to the TPC command may be configured when closed loop TPC (for example, CL-TPC) is performed in signal transmission between the UEs.

A given DCI (or a given PDCCH) for indicating at least one of cooperative PUSCH transmission between the UEs and resource assignment/scheduling for signal transmission between the UEs may be received/detected in a given control resource set/search space. The given control resource set/search space may be interpreted as at least one of a given time resource, a given frequency resource, and given subcarrier spacing.

The UE may attempt to detect (for example, blind detection) DCI for indicating UE cooperative PUSCH transmission in the given control resource set/search space. In this case, control may be performed so that detection of DCI (or a PDCCH) corresponding to UE cooperative PUSCH transmission is not performed in other control resource sets/search spaces.

Alternatively, the given DCI (or the given PDCCH) may be received/detected in any control resource set/search space.

The UE may attempt to detect (for example, blind detection) DCI for indicating UE cooperative PUSCH transmission in a configured control resource set/search space. The UE may determine whether a UE cooperative PUSCH is scheduled, based on whether or not the given DCI (or the given PDCCH) is subjected to CRC scrambling with an RNTI for UE cooperative PUSCH transmission. Alternatively, the UE may determine whether the UE cooperative PUSCH is scheduled, based on a given field of the DCI.

<Use of Plurality of DCIs>

The seventh embodiment illustrates a case in which the following operation 1 and operation 2 are performed, using one DCI (or a PDCCH).

Operation 1: Scheduling of the UE cooperative PUSCH and assignment of resources for signal transmission between the UEs Operation 2: Scheduling of a PUSCH (for example, PUSCH resources) for UE #1 and scheduling of a PUSCH for UE #2

The seventh embodiment is not limited to this, and the DCI/PDCCH may be transmitted a plurality of times (for example, twice). A part of information (for example, information related to scheduling) may be transmitted using the first DCI, and the rest of information may be transmitted using the second DCI. In this manner, the number of DCI bits in a single case can be reduced, and thus a coding rate can be reduced/an error rate can be improved.

Figure 23:
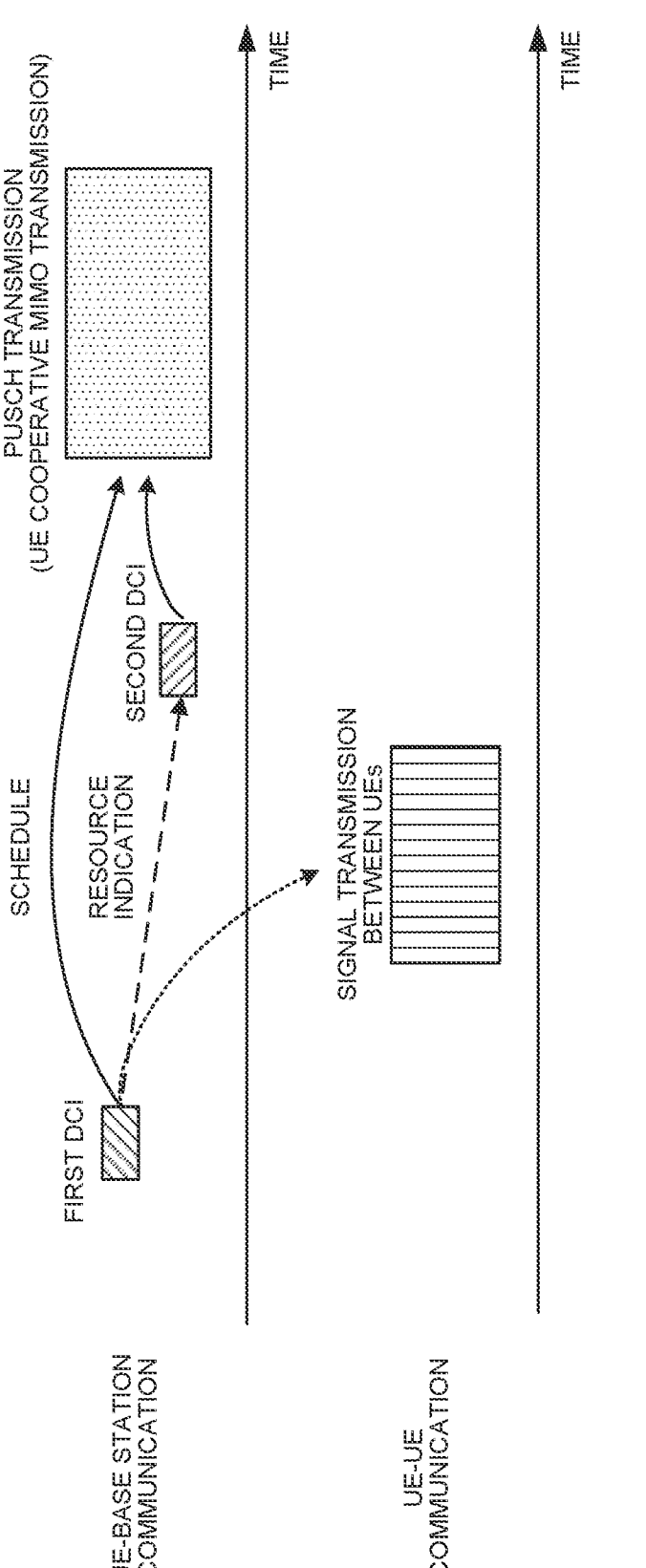
FIG. 23 is a diagram to show another example of communication control in UE cooperative MIMO according to the seventh embodiment.

For example, UE-shared information may be transmitted using the first DCI, and UE-dedicated information may be transmitted using the second DCI (see FIG. 23).

The first DCI may be subjected to CRC scrambling with an RNTI corresponding to given group-common. The first DCI may include information related to at least one of a resource of the second DCI/PDCCH, a monitoring occasion, a search space, and a control resource set. In this case, the number of times of detection of the second DCI and the like can be reduced.

The first DCI may include a UE-common DCI field. For example, a field for specifying a parameter configured to be common between the UEs may be included in the first DCI. The field may be at least one of a PUSCH timing indicator (for example, Timing indicator) field, a PUSCH time/frequency resource indication field, and a resource indication field for signal transmission between the UEs, for example.

The second DCI may be subjected to CRC scrambling with a UE-dedicated RNTI. The second DCI may include a UE-dedicated DCI field. For example, a field for specifying a parameter configured to be UE-dedicated may be included in the second DCI. The field may be at least one of a UL MIMO precoder/rank indication field, a UL beam indication (TPMI/SRI) field, a DMRS comb index (or CDM group index) field, and a TPC command field, for example.

FIG. 23 shows a case in which the first DCI is group-common and the second DCI is UE-dedicated, but this is not restrictive. Both of the first DCI and the second DCI may be UE-dedicated. The first DCI and the second DCI may be transmitted in the same slot/same CC/same BWP, or may be transmitted in different slots/different CCs/different BWPs.

A DAI field (for example, a counter DAI/total DAI) may be included in the first DCI/second DCI. The counter DAI indicates a count value of the DCI (or the PDCCH), and the total DAI indicates a total number of DCIs (or PDCCHs). In this manner, even when the UE fails to receive either DCI, a detection error of the first DCI/second DCI can be determined based on the counter DAI/total DAI included in each DCI.

When the UE is configured/defined with reception of the first DCI and the second DCI (or two-step DCI) and receives only either the first DCI (for example, the group-common DCI) or the second DCI (for example, the UE-dedicated DCI), the UE may detect a reception error of either DCI.

When a HARQ process ID field is included in the first DCI and the second DCI, the UE may assume that the first DCI and the second DCI including the same HARQ process ID correspond to each other. When the UE can receive only either the first DCI or the second DCI regarding the same HARQ process ID (for example, within given time period), the UE may detect an error in either DCI.

Order of transmission/reception of the first DCI and the second DCI may be defined. For example, the second DCI may be transmitted/received after the first DCI. In this manner, operation in the UE for detecting an error in the DCI can be simplified.

When an error occurs in either DCI, the UE may perform control not to perform communication between the UEs/UE cooperative PUSCH transmission. When the base station does not receive PUSCH transmission (UE cooperative PUSCH transmission) transmitted from the UE, the base station may determine that the UE has made an error in detection of the first DCI/second DCI, and perform retransmission of the DCI.

Alternatively, when an error occurs in given DCI, the UE may perform control not to perform communication between the UEs/UE cooperative PUSCH transmission. For example, when the UE makes an error in detection of the first DCI and receives the second DCI, the UE may perform control to perform communication between the UEs and not to perform UE cooperative PUSCH transmission. When the UE receives the first DCI and makes an error in detection of the second DCI, the UE may perform control not to perform either communication between the UEs or UE cooperative PUSCH transmission. In this manner, successfully and correctly received DCI can be appropriately used.

Eighth Embodiment

When the UE performs UL transmission using UE cooperative MIMO, the UE may perform control to report/notify/transfer/perform information sharing of (hereinafter also referred to as transfer/information sharing) data/control information including transmission data of a physical layer to another UE, based on given units.

Figures 24A, 24B:
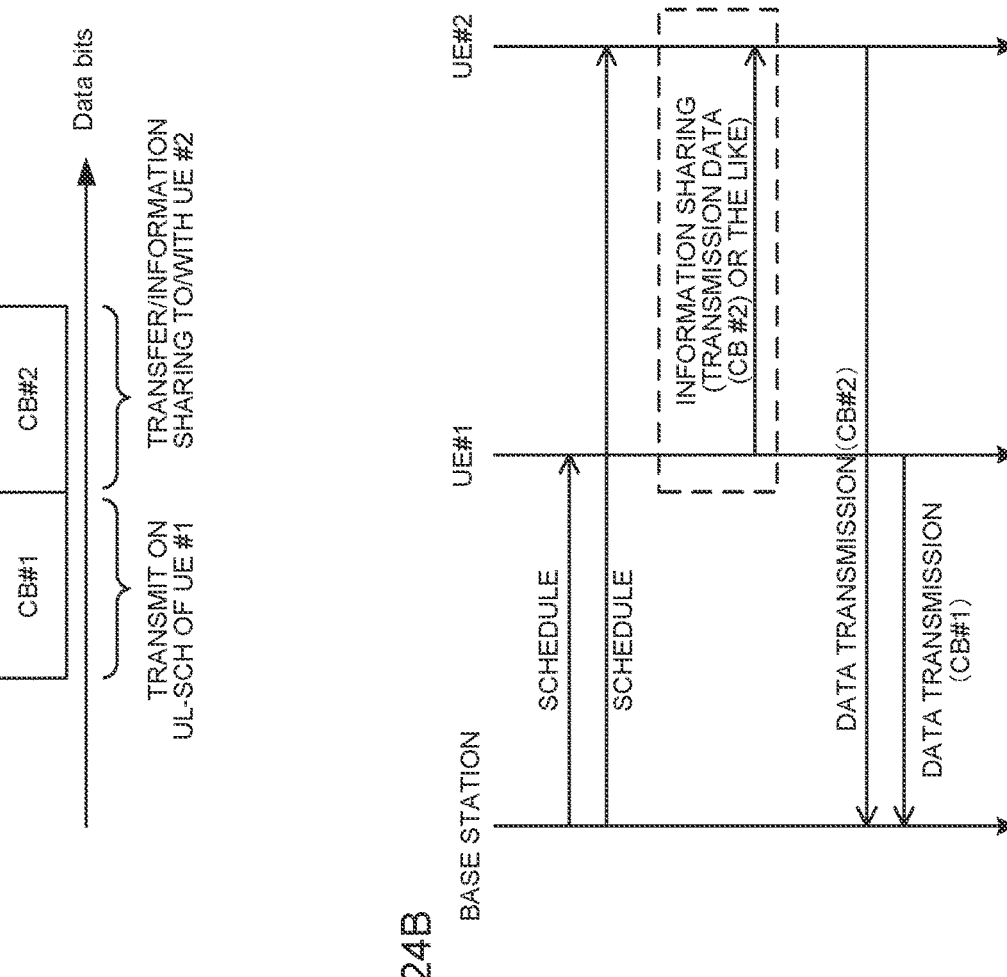
FIG. 24A and FIG. 24B are diagrams to show examples of control of information sharing between UEs in UE cooperative MIMO according to an eighth embodiment.

The UE may segment UL data transmitted by its terminal in given units (see FIG. 24A), and transfer/perform information sharing of the UL data to/with another UE (see FIG. 24B). The given units may be at least one of transport block (TB), codeword (CW), code block (CB), and bit units. FIG. 24A and FIG. 24B show a case in which segmentation is performed in CB units, but this is not restrictive.

The UE may segment a part of the TBs/CWs/CBs of the UL data transmitted by its terminal, and thereby perform segmentation into data to be transmitted on the UL-SCH of its terminal and data to be transferred/subjected to information sharing to/with another UE. By performing segmentation in TB/CW/CB units, error determination/retransmission can be appropriately performed.

For example, when the UL data is segmented in CB units, even if an error occurs in the UL data (CBs) to be transmitted from one UE, only the CB with the error can be retransmitted. In contrast, when the UL data is segmented in bit units, if an error occurs in a part of the CBs, control may be performed so that all of the CBs are retransmitted.

Separation (for example, a boundary for segmenting the UL data) between the UL data to be transmitted by its terminal (for example, UE #1) and the UL data to be transmitted by another UE (for example, UE #2) may be configured in a higher layer or the like, or may be determined based on a given rule.

The configuration by the higher layer may be configured based on the number of TBs/CWs/CBs, may be configured based on the number of bits of the UL-SCH of each UE, or may be configured based on the coding rate of the UL-SCH of each UE.

The given rule may be that the number of bits of the UL-SCH of a plurality of UEs (for example, UE #1 and UE #2) is made equal. The UE may perform segmentation into data corresponding to its terminal (for example, data to be transmitted from the antenna port of its terminal to the base station) and data corresponding to another terminal (for example, data to be transmitted from the antenna port of another terminal to the base station), based on the given rule. The UE may consider that the first half of the segmented pieces of data (for example, TBs/CWs/CBs/bits) to be addressed to its terminal and the latter half thereof to be addressed to another terminal.

<Information Sharing Between UEs>

When the UE (for example, UE #1) performs transfer/information sharing to/with another UE (for example, UE #2), a framework/mechanism of another communication system different from that of 3GPP may be used. For example, UE #1 may perform control to transmit given information to UE #2, using a wireless LAN (for example, WiFi) or near field data communication (for example, Bluetooth) (see FIG. 25). A fact that the UE gives notification of given information using a framework/mechanism of another communication system may correspond to a fact that the UE transmits physical layer information to be transferred to a higher layer for the purpose of communication between the UEs. UE #2 may perform control to transmit physical layer information received from a higher layer on the UL-SCH.

Figure 25:
FIG. 25 is a diagram to show another example of control of information sharing between UEs in UE cooperative MIMO according to the eighth embodiment.

In FIG. 25, UE #1 transmits CB #2 out of the UL data (for example, CB #1+CB #2) to UE #2, using a higher layer. A case is shown in which UE #1 then transmits CB #1 as the UL data (for example, on the UL-SCH of UE #1), and UE #2 transmits CB #2 as the UL data (for example, on the UL-SCH of UE #2).

Alternatively, when the UE (for example, UE #1) performs transfer/information sharing to/with another UE (for example, UE #2), a method of transmission and reception between the UEs of a physical layer may be used. For example, UE #1 may perform control to transmit given information to UE #2, using at least one of a channel for D2D and a sidelink (see FIG. 26).

Figure 26:
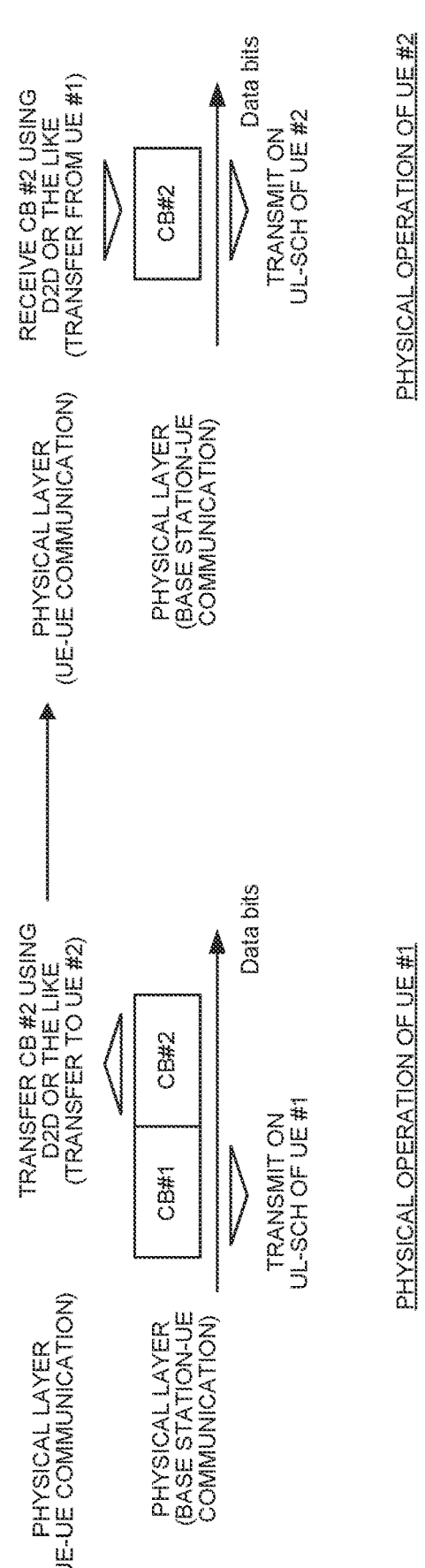
FIG. 26 is a diagram to show another example of control of information sharing between UEs in UE cooperative MIMO according to the eighth embodiment.

In FIG. 26, UE #1 transmits CB #2 out of the UL data (for example, CB #1+CB #2) to UE #2, using D2D/sidelink. A case is shown in which UE #1 then transmits CB #1 as the UL data (for example, on the UL-SCH of UE #1), and UE #2 transmits CB #2 as the UL data (for example, on the UL-SCH of UE #2).

When the method of transmission and reception between the UEs of a physical layer is used, the base station may control scheduling. When D2D/sidelink is applied in information sharing between the UEs, at least one of a configuration (aspect 5-1) in which resources are autonomously selected between a plurality of UEs such that transmission is controlled and a configuration (aspect 5-2) in which the base station selects/schedules transmission resources between a plurality of UEs such that transmission is controlled may be applied.

<Aspect 5-1>

When resources are autonomously selected between the UEs such that transmission is controlled, the base station may configure a resource pool for each UE, using higher layer signaling. The UE may autonomously select resources based on the resource pool, and perform transmission to another UE (see FIG. 27A and FIG. 27B).

In FIG. 27A and FIG. 27B, UE #1 transmits a part of UL data (for example, CB #2) out of the UL data (for example, CB #1+CB #2) to UE #2, using resources included in the resource pool configured in the higher layer in advance. A case is shown in which UE #1 then transmits CB #1 as the UL data (for example, on the UL-SCH of UE #1), and UE #2 transmits CB #2 as the UL data (for example, on the UL-SCH of UE #2). The base station may simultaneously perform scheduling of the UL data for each UE and scheduling of cooperative transmission between the UEs.

FIG. 27B shows a case in which UE-dedicated DCI is transmitted to each UE (aspect 4-1), but the method illustrated in aspect 4-2/aspect 4-3 may be applied.

When the UE configured with a resource pool by a higher layer transmits a signal in communication between the UEs, the UE may select resources out of the resource pool and transmit the signal to another terminal, using the selected resources. In this case, the UE may autonomously perform carrier sensing or the like to determine a state of the resource pool (for example, whether or not there is availability), or may determine the state of the resource pool based on information informed/broadcast or indicated from the base station.

For selection of the resource pool, the UE may perform selection at random based on a random number or the like, or may perform selection based on a given rule. A receiving-side UE (for example, UE #2) may receive/measure the resources (or the resource pool) configured by the higher layer, and receive a signal addressed to its terminal. For determination as to whether the signal is a signal addressed to its terminal, for example, determination may be made based on whether the CRC inserted into the data can be solved based on an ID (or a C-RNTI) of the terminal (for example, a CRC check).

Alternatively, the UE need not use the resource pool in information sharing between the UEs. In this case, control may be performed so that transmission is performed when the resources are available as in CSMA/CA (Carrier Sense Multiple Access/Collision Avoidance) of WiFi and LBT (Listen Before Talk) of NRU (NR unlicensed), and the receiving side may decode a received signal, and determine whether the signal is a signal addressed to its terminal based on information of a MAC header or the like.

<Aspect 5-2>

When the base station selects resources for transmission between the UEs, the base station may indicate/schedule the resources used for transmission between the UEs for each UE. The UE may control transmission between the UEs, using the resources scheduled from the base station (see FIG. 28A and FIG. 28B).

The data transfer source UE (here, UE #1) assigned the resources from the base station segments physical layer data (TBs/CWs/CBs) and transmits a part of the data (here, CB #2) to another UE #2, using the assigned resources. The data transfer destination UE (here, UE #2) assigned the resources from the base station may measure/receive the assigned resources, receive the segmented physical layer data (TBs/CWs/CBs), and perform transmission to the base station, using the UL-SCH of UE #2.

Figures 28A, 28B:
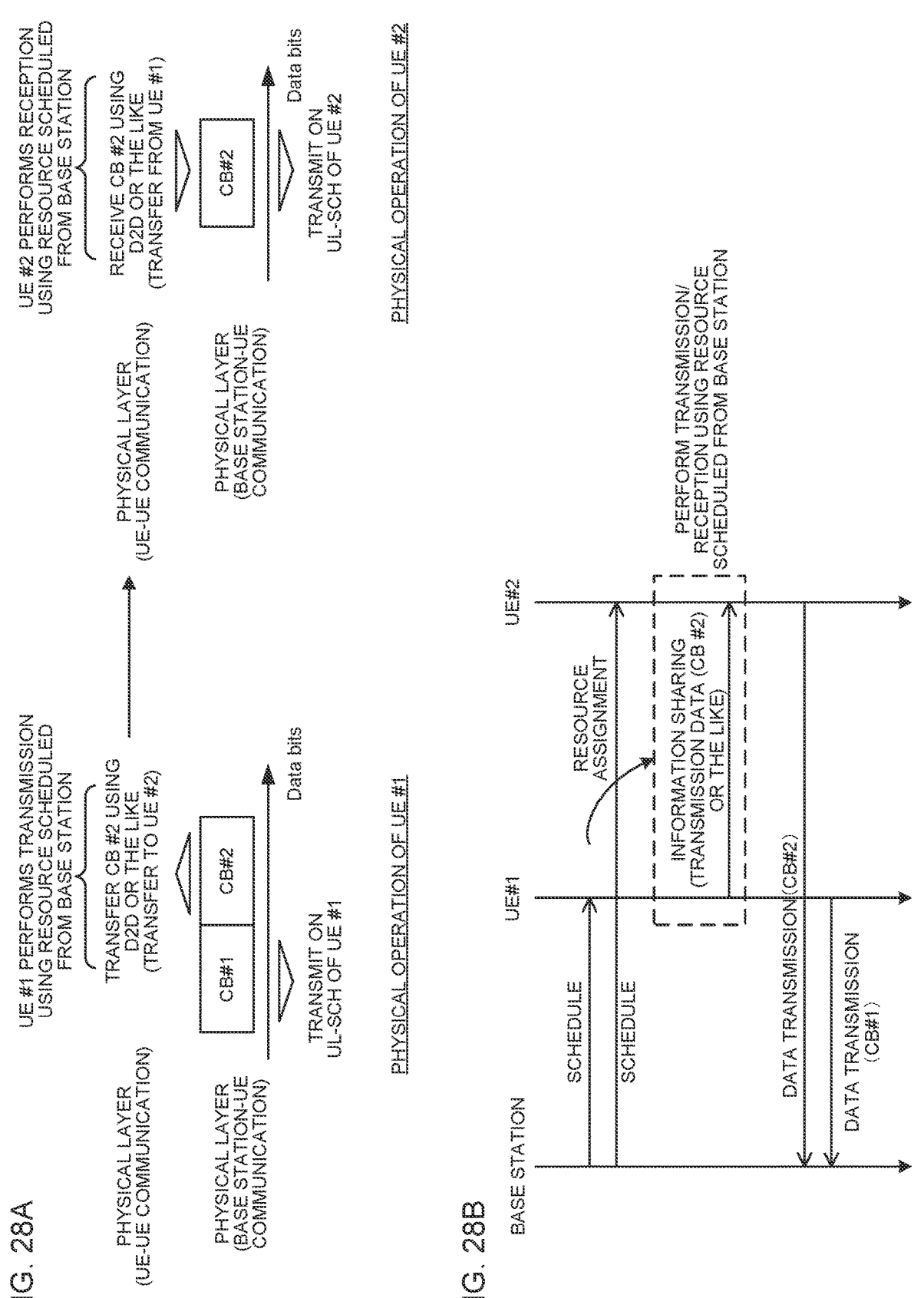
FIG. 28A and FIG. 28B are diagrams to show other examples of control of information sharing between UEs in UE cooperative MIMO according to the eighth embodiment.

In FIG. 28A and FIG. 28B, UE #1 transmits a part of UL data (for example, CB #2) out of the UL data (for example, CB #1+CB #2) to UE #2, using the resources scheduled from the base station. A case is shown in which UE #1 then transmits CB #1 as the UL data (for example, on the UL-SCH of UE #1), and UE #2 transmits CB #2 as the UL data (for example, on the UL-SCH of UE #2). The base station may simultaneously perform scheduling of the UL data for each UE and scheduling of cooperative transmission between the UEs.

FIG. 28B shows a case in which UE-dedicated DCI is transmitted to each UE (aspect 4-1), but the method illustrated in aspect 4-2/aspect 4-3 may be applied.

Ninth Embodiment

When communication is performed using UE cooperative MIMO, the base station may recognize channel information between each UE and the base station, based on a UL signal transmitted from the UE. The UL signal may be a given reference signal (for example, an SRS), or may be another signal.

The base station may indicate/configure/trigger transmission of the UL signal/RS (hereinafter also referred to as an SRS) for each UE before performing scheduling of each UE (for example, scheduling of UE cooperative MIMO transmission/scheduling of signal transmission between the UEs). The base station may determine the TPMI/SRI of each UE, based on the received SRS.

Figures 29A, 29B:
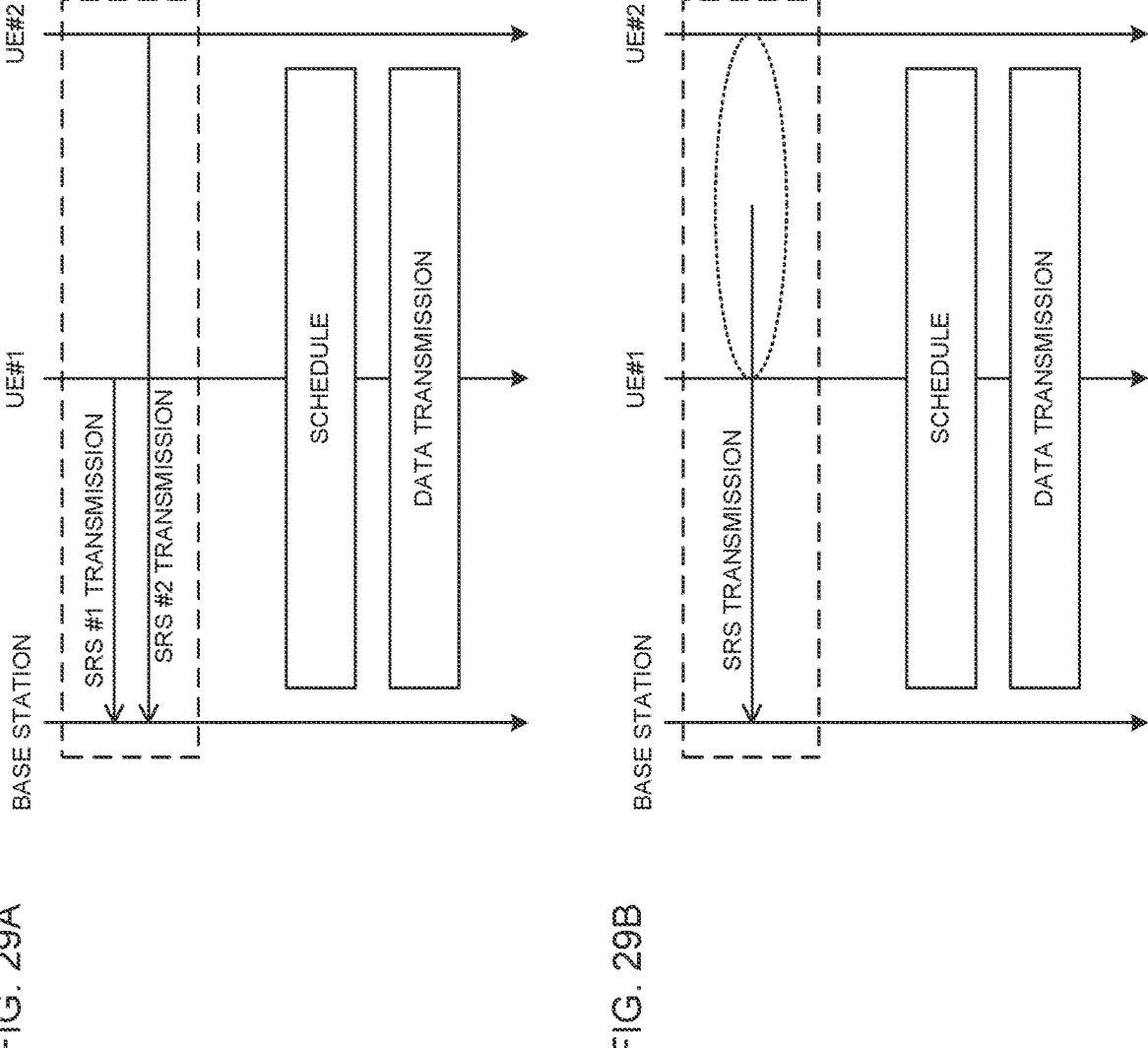
FIG. 29A and FIG. 29B are diagrams to show examples of SRS transmission in UE cooperative MIMO according to a ninth embodiment.

In transmission of SRSs, the SRSs (here, SRS #1 and SRS #2) transmitted from respective UEs (for example, UE #1 and UE #2) may use different SRS resources (see FIG. 29A). The base station may configure different SRS resources for UE #1 and UE #2, using higher layer signaling or the like.

In this case, SRS transmission timings (for example, timing advance) may not be aligned between the UEs. When the transmission timings of the SRSs transmitted from respective UEs are different, the base station may adjust timing advance, based on reception results of the SRSs. The UE may have timing advance controlled from the base station, after SRS transmission.

When timing advance is adjusted based on the SRS, the UE may receive a timing advance command included in a MAC CE (TA command in MAC CE) transmitted on a PDSCH after SRS transmission. When the UE receives the timing advance command, the UE may adjust timing advance (or transmission timing of the UL), based on the received information.

Alternatively, in transmission of SRSs, the SRSs (here, SRS #1 and SRS #2) transmitted from respective UEs (for example, UE #1 and UE #2) may use the same/common SRS resources (see FIG. 29B). The base station may configure common SRS resources for UE #1 and UE #2, using higher layer signaling or the like. The respective UEs cooperate with each other and transmit the SRSs, using one SRS resource.

In this case, the UEs need to have their SRS transmission timings (timing advance) aligned with each other. Thus, control may be performed so that timing advance is adjusted based on UL transmission (for example, a PRACH/SRS/PUSCH/PUCCH or the like) before SRS transmission.

Figure 30:
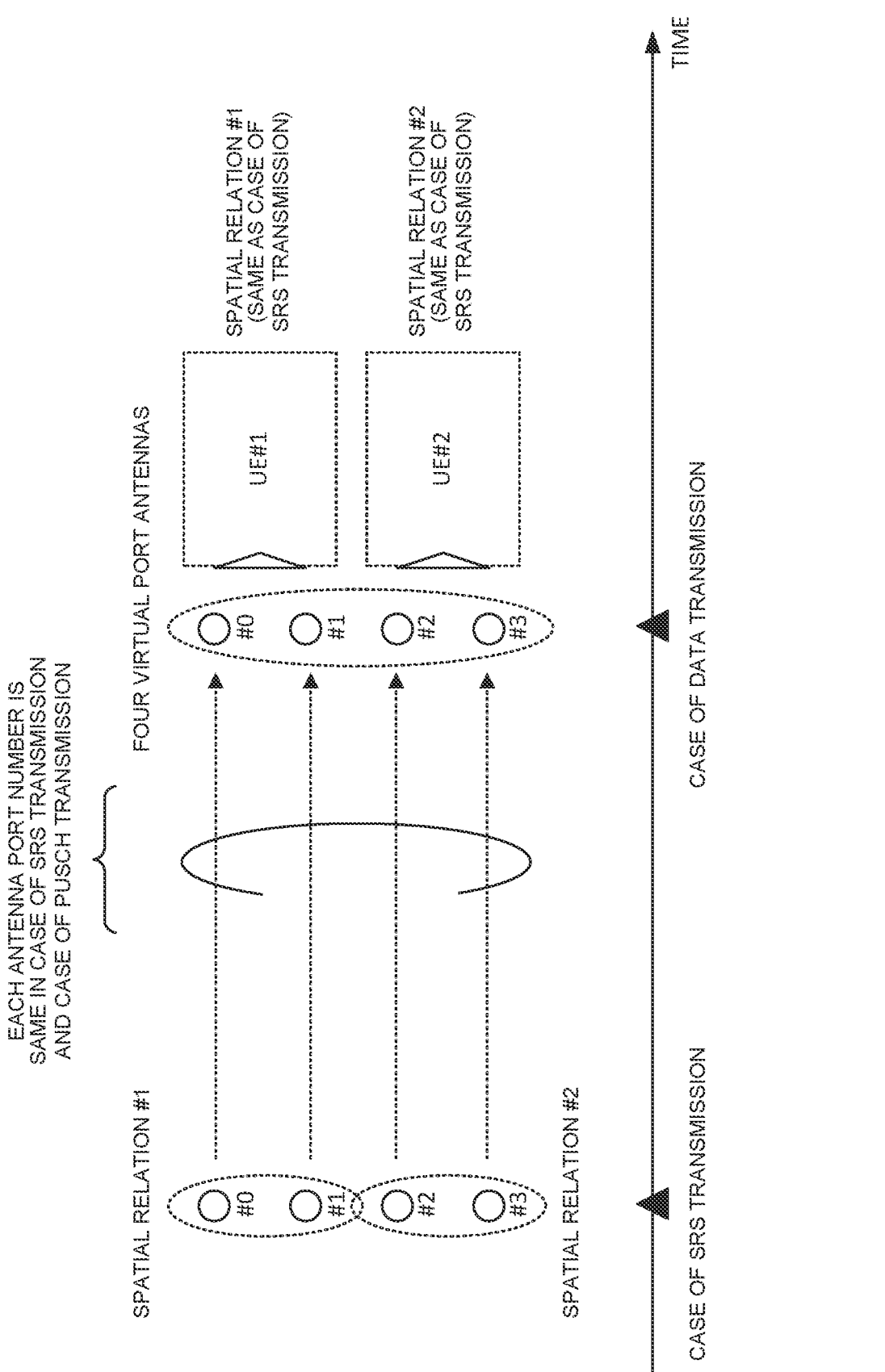
FIG. 30 is a diagram to show an example of SRS transmission and PUSCH transmission in UE cooperative MIMO according to the ninth embodiment.

In the case of SRS transmission and the case of PUSCH transmission (for example, the case of UE cooperative PUSCH transmission), correspondence of each antenna port may be the same (see FIG. 30). For example, the antenna port may not be interchanged across the UEs in the case of SRS transmission and the case of PUSCH transmission. Alternatively, in the case of SRS transmission and the case of PUSCH transmission, a UL beam (for example, SRI/spatial relation) may not be changed.

The UE may assume that a beam (for example, spatial relation/TCI state/quasi co-location) of each antenna port in PUSCH transmission is the same as that in the case of recent SRS transmission. FIG. 30 shows a case in which the antenna ports (#0 and #1) and spatial relation (#1) corresponding to UE #1 in the case of SRS transmission and the antenna ports (#0 and #1) and spatial relation (#1) corresponding to UE #1 in the case of PUSCH transmission are the same. Similarly, a case is shown in which the antenna ports (#2 and #3) and spatial relation (#2) corresponding to UE #2 in the case of SRS transmission and the antenna ports (#2 and #3) and spatial relation (#2) corresponding to UE #2 in the case of PUSCH transmission are the same.

FIG. 30 takes an example of PUSCH transmission; however, this is not restrictive, and the same mechanism/rule may also be applied to transmission of another UL signal/UL channel (for example, a PUCCH) cooperatively transmitted between the UEs.

When one or more UEs (for example, the UEs performing UE cooperative MIMO) transmit a UL signal/UL channel, a plurality of beams (for example, TCI states, spatial relations, or quasi co-locations (QCLs)) may be configured for one UL signal/UL channel (or a resource of one UL signal/UL channel). The UL signal/UL channel may be interpreted as at least one of an SRS, a PUSCH, and a PUCCH.

Figure 31:
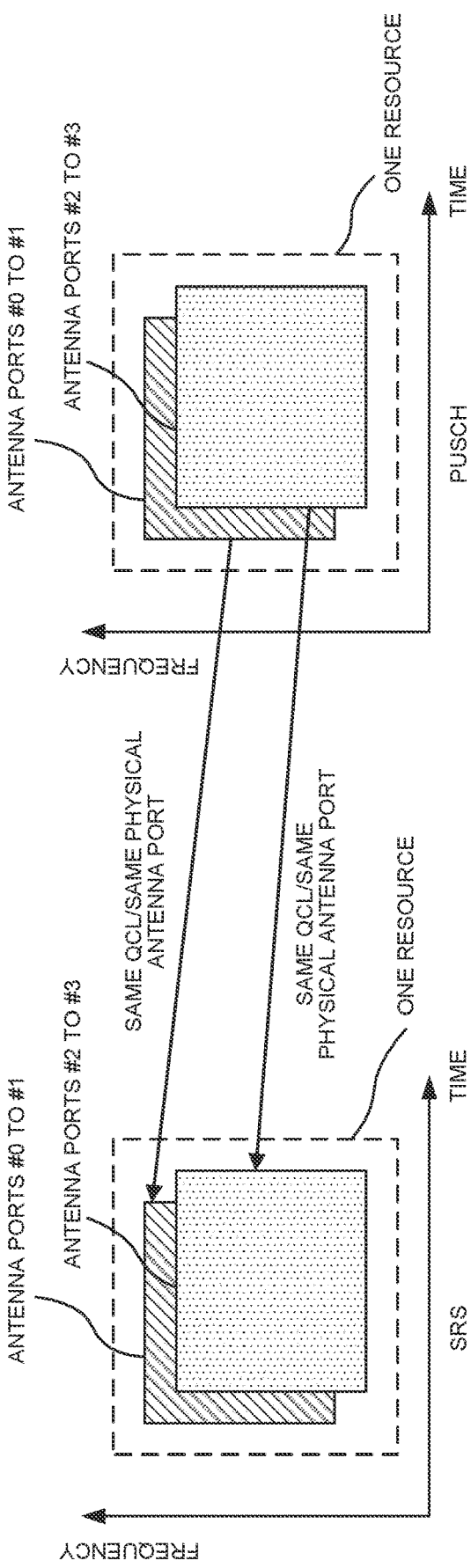
FIG. 31 is a diagram to show another example of SRS transmission and PUSCH transmission in UE cooperative MIMO according to the ninth embodiment.

In this case, between channels of the SRS/PUSCH/PUCCH (or between signals and channels), the same antenna ports may be mapped to the same physical antenna ports (see FIG. 31). Between the channels of the SRS/PUSCH/PUCCH (or between the signals and the channels), the same antenna ports may be associated with the same beams (for example, TCI states, spatial relations, or quasi co-locations).

In FIG. 31, the number of antenna ports in the case of SRS transmission and the number of antenna ports in the case of PUSCH transmission are the same. In the case of SRS transmission and the case of PUSCH transmission, the same beams (for example, TCI states, spatial relations, or quasi co-locations) may be configured between the same number of antenna ports. A plurality of TCI states (for example, TCI state #1 and TCI state #2) may be configured for a common SRS resource (for example, SRS resource #1).

Phase may be continuous (coherent) between antenna ports #0 and #1, phase may be continuous (coherent) between antenna ports #2 and #3, and phase may not be continuous (not coherent) between antenna ports #0 to #1 and antenna ports #2 to #3.

(For example, different) TCI states/spatial relations/QCLs may be separately configurable for each antenna port (see FIG. 32). FIG. 32 shows a case in which TCI state #1 and TCI state #2 are configured for a common SRS resource (for example, SRS resource #1). In this case, the TCI state may be mapped to each antenna port, based on a given rule. Here, a case is shown in which TCI state IDs having small indexes are mapped to/associated with antenna port numbers having small numbers.

Specifically, TCI state #1 is configured for antenna ports #0 and #1 of SRS resource #1, and TCI state #2 is configured for antenna ports #2 and #3 of SRS resource #1. A case is shown in which association between the antenna ports and the TCI states are the same also in transmission (for example, PUSCH transmission) of different UL signals/UL channels. Specifically, TCI state #1 is configured for antenna ports #0 and #1 of PUSCH resource #1, and TCI state #2 is configured for antenna ports #2 and #3 of PUSCH resource #1.

<Variations>

FIG. 32 shows a case in which a plurality of beams (for example, spatial relations/TCI states/quasi co-locations) are configured for one UL signal/UL channel, but this is not restrictive. One beam (for example, spatial relation/TCI state/quasi co-location) may be configured for each UL signal/UL channel (see FIG. 33). In other words, (for example, different) TCI states/spatial relations/QCLs may be separately configurable for each resource.

FIG. 33 shows a case in which TCI state #1 is configured for SRS resource #1 (or antenna ports #0 and #1 corresponding to SRS resource #1), and TCI state #2 is configured for SRS resource #2 (or antenna ports #2 and #3 corresponding to SRS resource #2).

Association between the antenna ports and the TCI states may be the same also in transmission (for example, PUSCH transmission) of different UL signals/UL channels. For example, TCI state #1 may be configured for PUSCH resource #1 (or antenna ports #0 and #1 corresponding to PUSCH resource #1), and TCI state #2 may be configured for PUSCH resource #2 (or antenna ports #2 and #3 corresponding to PUSCH resource #2).

Tenth Embodiment

When communication is performed using UE cooperative MIMO, if an error occurs in transmission (for example, when the error is detected in the base station) in data (for example, TB/CW/CB units) transmitted by each UE, given retransmission control may be performed. The base station may indicate a retransmission indication for the UE, based on a CRC check or an error determination code.

For example, the UE may perform retransmission control, based on at least one of aspect 7-1 and aspect 7-2. The following description will take an example of a case in which transmission data (or UL data) is segmented in CB units, but this is not restrictive.

<Aspect 7-1>

Figure 34:
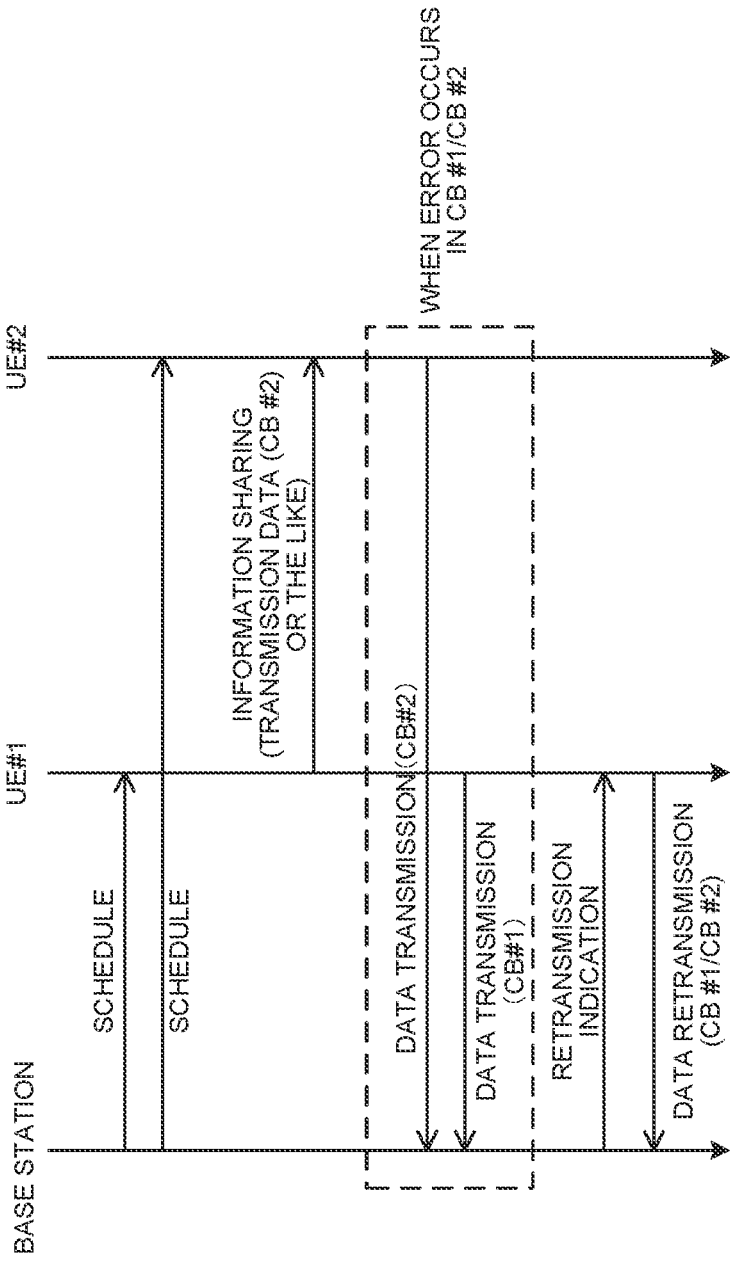
FIG. 34 is a diagram to show an example of retransmission control in UE cooperative MIMO according to a tenth embodiment.

Regardless of which UL data (or UL data transmitted by which UE) has an error, a data transmission source UE (for example, UE #1) may perform control to retransmit the UL data (see FIG. 34). FIG. 34 shows a case in which, out of the UL data (for example, CB #1+CB #2) of UE #1, CB #1 is transmitted from UE #1 (or the antenna port of UE #1) and CB #2 is transmitted from UE #2 (or the antenna port of UE #2).

When an error occurs in transmission of at least one of CB #1 and CB #2, UE #1 may perform control to perform retransmission of the CB from UE #1. In this case, UE #1 may perform control to retransmit only the CB with the error, or may perform control to retransmit the CB without the error as well.

The resources used for retransmission may be resources (for example, resources for retransmission) different from the resources scheduled for UL data transmission. The resources for retransmission may be defined in a specification, or may be configured from the base station to the UE using higher layer signaling or the like. When the UE receives information related to a retransmission indication (or information related to an error) from the base station, the UE may transmit a PUSCH for retransmission, using the given resources.

When an error is detected in at least one of CB #1 transmitted from UE #1 and CB #2 transmitted from UE #2, the base station may notify UE #1 (or UE #1 and UE #2) of the information related to a retransmission indication. In this case, UE #1 may perform control to perform retransmission.

As described above, by performing control so that the UE (UE #1) as a transmission source or a data transfer source performs retransmission, even if an error is detected in the CB not having been transferred to another UE, new transfer between the UEs for retransmission can be made unnecessary.

<Aspect 7-2>

Based on which UL data (or UL data transmitted by which UE) has an error, the UE that performs retransmission may be determined/selected.

<<Option A>>

The UE notified by the base station of a retransmission indication of the CB transmitted in the case of initial transmission (or notified that the CB has an error) (or the UE that has made an error in transmission) may perform control to retransmit the CB.

The base station may schedule PUSCH resources for transmitting data for retransmission for the UE. The UE may transmit UL data for which retransmission using the resources scheduled from the base station is indicated. Note that the UE may perform control to retransmit only the CB with the error, or may perform control to retransmit the CB without the error as well.

The resources used for retransmission may be resources (for example, resources for retransmission) different from the resources scheduled for UL data transmission. The resources for retransmission may be defined in a specification, or may be configured from the base station to the UE using higher layer signaling or the like. When the UE receives information related to a retransmission indication (or information related to an error) from the base station, the UE may transmit a PUSCH for retransmission, using the given resources.

The base station may notify the UE as a UL data transmission source of the retransmission indication of the UL data. For example, when an error is detected in CB #1 transmitted from UE #1, the base station may notify UE #1 of the information related to a retransmission indication. When an error is detected in CB #2 transmitted from UE #2, the base station may notify UE #2 of the information related to a retransmission indication. As described above, by causing the UE having made an error in transmission of UL data to perform retransmission, new transfer between the UEs for retransmission can be made unnecessary.

Note that, when an error is detected in one of the CBs (for example, CB #2 transmitted from UE #2), the base station may notify both of the UEs (for example, UE #1 and UE #2) of the information related to a retransmission indication. In this case, retransmission may be performed from only UE #2, or control may be performed so that retransmission is performed from both of UE #1 and UE #2.

<<Option B>>

The UE notified by the base station of a retransmission indication of the CB transmitted in the case of initial transmission (or notified that the CB has an error) (or the UE that has made an error in transmission) may perform control not to retransmit the CB (so that another UE transmits the CB with the error).

Figure 35:
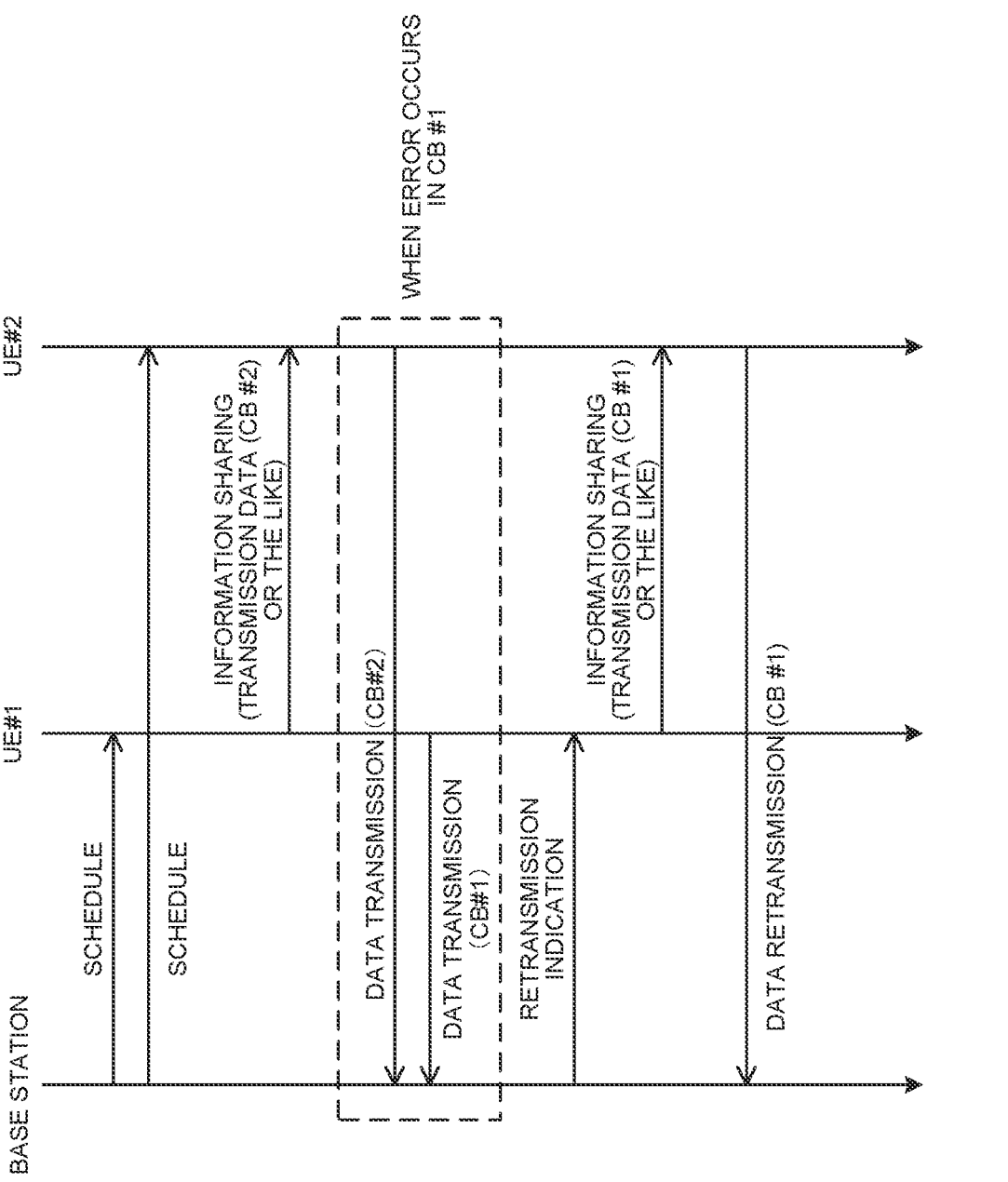
FIG. 35 is a diagram to show another example of retransmission control in UE cooperative MIMO according to the tenth embodiment.

For example, when an error is detected in CB #1 transmitted from UE #1, control may be performed so that CB #1 is retransmitted from UE #2 (see FIG. 35). In this case, UE #1 may transfer/perform information sharing of CB #1 to/with UE #2, and UE #2 may transmit CB #1 to the base station. The base station may notify UE #1 of the information related to a retransmission indication, or may notify both of UE #1 and UE #2 of the information related to a retransmission indication. Control of transfer from UE #1 to UE #2 may be applied to the above embodiments (for example, the eighth embodiment).

When an error is detected in CB #2 transmitted from UE #2, control may be performed so that CB #2 is retransmitted from UE #1. In this case, UE #1 recognizes information of CB #2, and transfer between the UEs is thus unnecessary. The base station may notify UE #1 of the information related to a retransmission indication, or may notify both of UE #1 and UE #2 of the information related to a retransmission indication.

As described above, by causing another UE different from the UE that has made an error in transmission to perform retransmission, retransmission can be performed from the UE in a good communication environment.

Note that, when an error is detected in the CB from both of the UEs, control may be performed so that retransmission is performed from a specific UE (for example, UE #1), or control may be performed so that retransmission is performed from each of the UEs.

(Supplementary Explanation)

The above embodiments may be applied to only the UE that has reported support in UE capability signaling (for example, UE capability signaling). The above embodiments have illustrated a configuration in which a part of data of UE #1 is also transmitted from UE #2; however, based on the configuration, regarding whether data transfer from UE #2 to U ##1 is acceptable or not (or whether data transfer in both directions is acceptable or not), whether this can be supported or not may be reported using other UE capability signaling.

The above embodiments may be applied when being configured from the base station, using higher layer control signal or the like. In the above embodiments, UE #1 and UE #2 may be interpreted as a first UE and a second UE, a master UE and a slave UE, or a primary UE and a secondary UE.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 36:
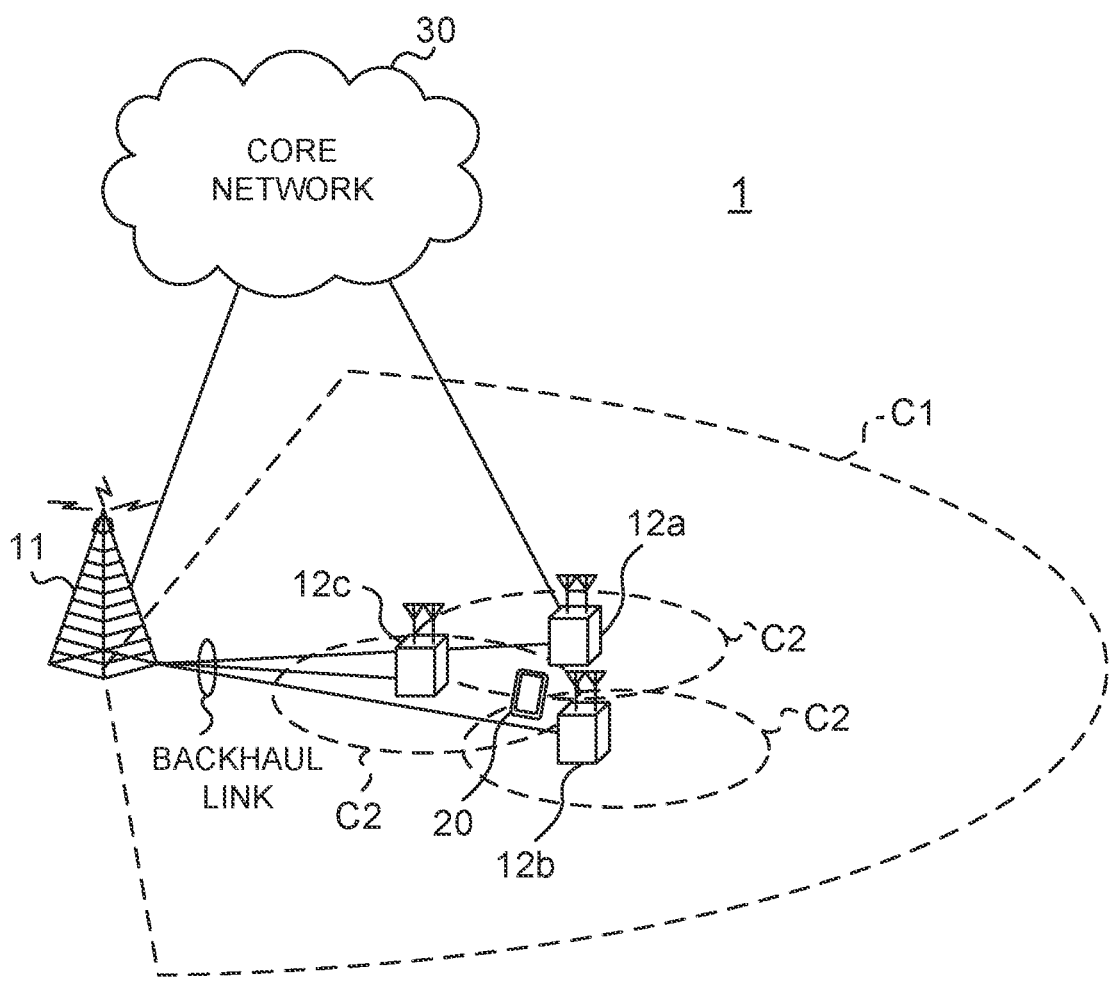
FIG. 36 is a diagram to show an example of a schematic structure of a radio communication system according to one embodiment.

FIG. 36 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (LAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 37:
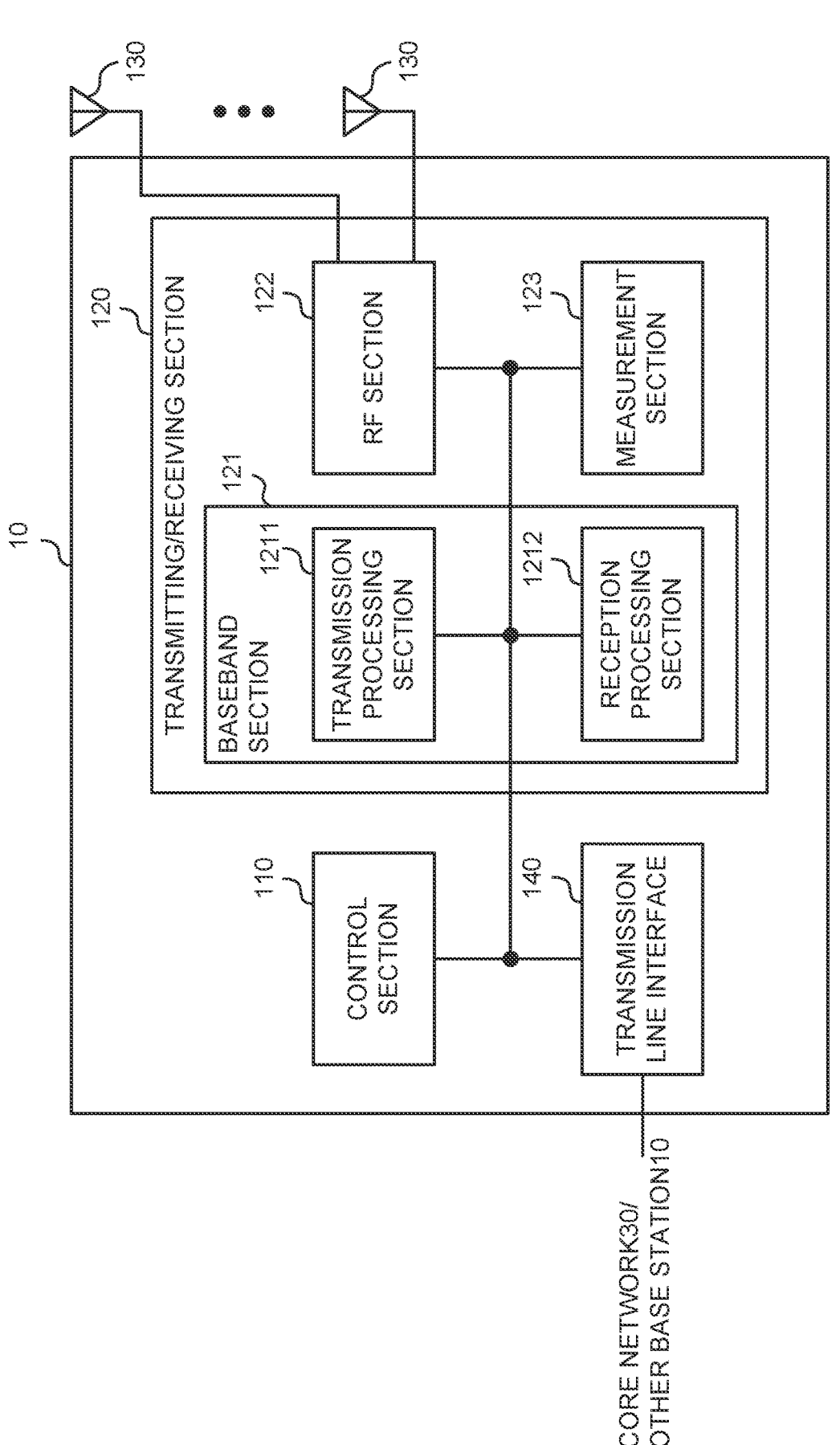
FIG. 37 is a diagram to show an example of a structure of a base station according to one embodiment.

FIG. 37 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information related to a transmission path for at least a part of UL data to a terminal.

The control section 110 may indicate, for the terminal, at least one of a transmission method of the UL data and a second terminal other than the terminal, the second terminal being notified of at least the part of the UL data, by using at least one of the information related to the transmission path and downlink control information used for scheduling of the UL data.

(User Terminal)

Figure 38:
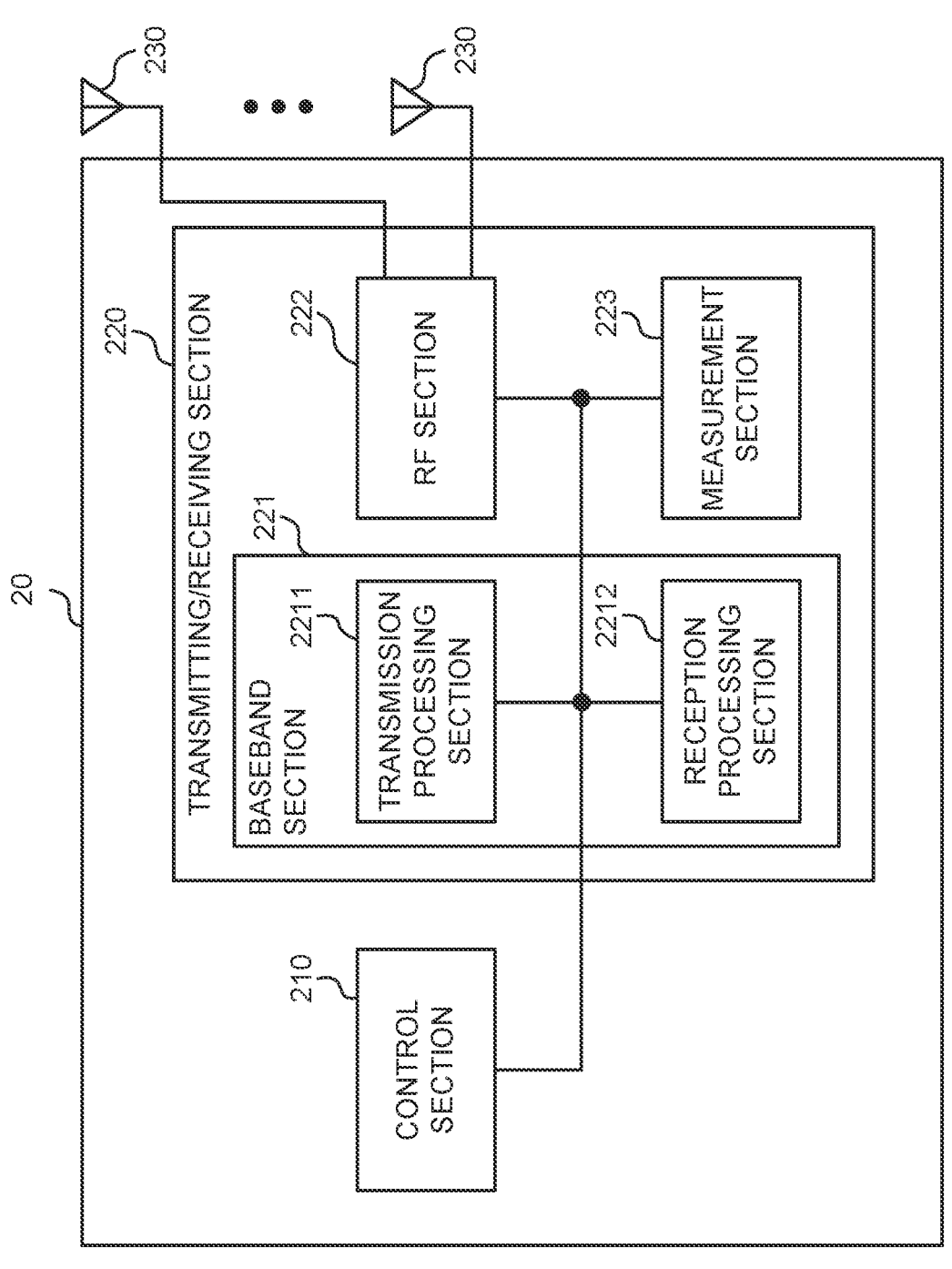
FIG. 38 is a diagram to show an example of a structure of a user terminal according to one embodiment.

FIG. 38 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/ receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to a transmission path for at least a part of UL data.

The control section 110 may determine at least one of a transmission method of the UL data and a second terminal other than the terminal, the second terminal being notified of at least the part of the UL data, based on at least one of the information related to the transmission path and downlink control information used for scheduling of the UL data.

A configuration may be supported in which the transmission path for at least the part of the UL data corresponding to initial transmission and the transmission path for at least the part of the UL data corresponding to retransmission are separately configured.

When the control section 110 retransmits UL data not having been notified to the second terminal out of the UL data in the initial transmission, the control section 110 may perform control to notify the second terminal of the UL data not having been notified to the second terminal. The control section 110 may determine whether or not to cooperate with the second terminal and transmit the UL data, based on a parameter corresponding to the downlink control information.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 39:
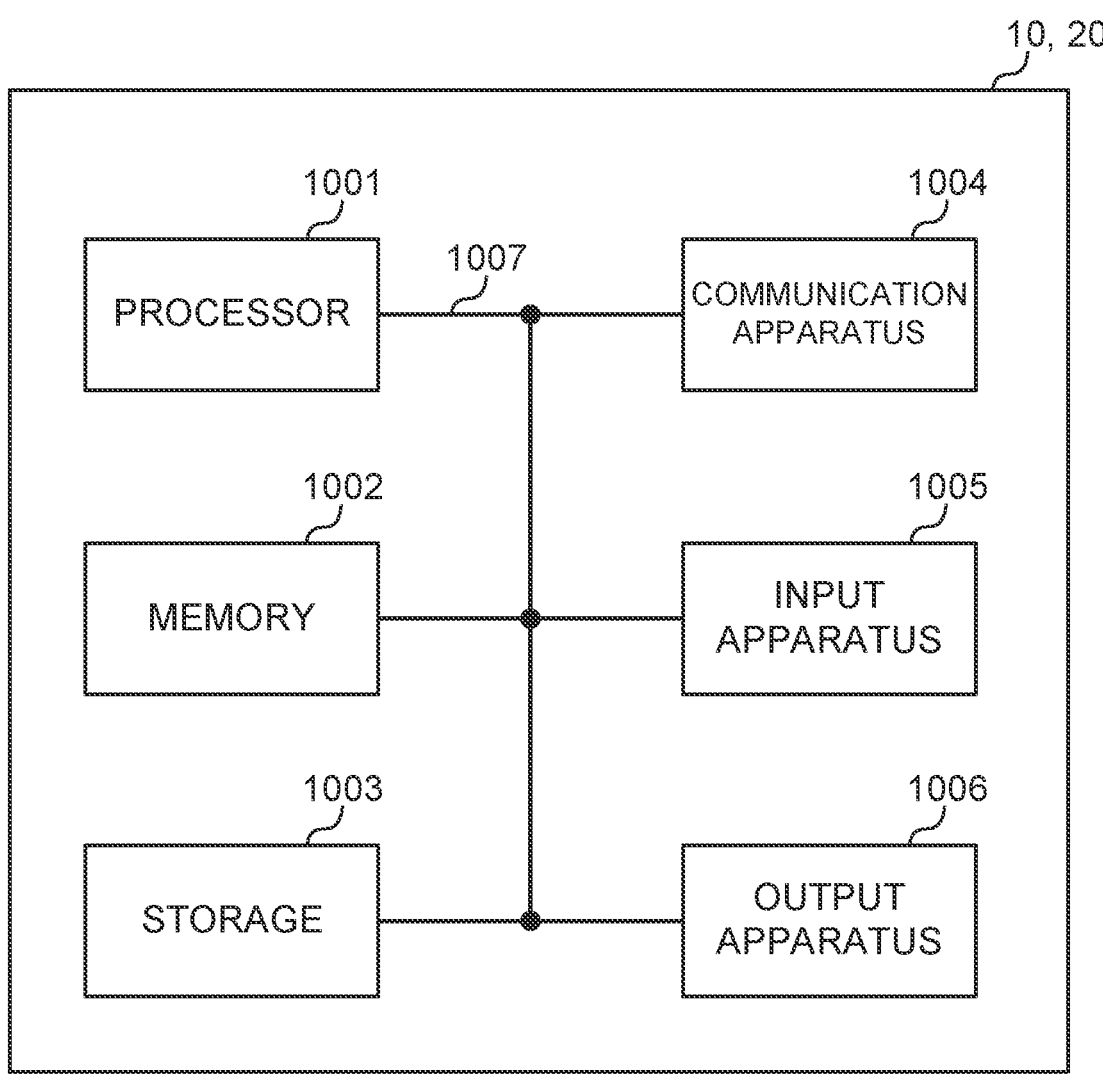
FIG. 39 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 39 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier,"

and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words such as "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives information related to a transmission path for at least a part of UL data;
a processor that determines at least one of a transmission method of the UL data and a second terminal other than the terminal, the second terminal being notified of at least the part of the UL data, based on at least one of the information related to the transmission path and downlink control information (DCI) used for scheduling of the UL data; and
a transmitter that, when receiving first DCI as the DCI, transmits the UL data without cooperating between an antenna port of the terminal and an antenna port of another transmitting apparatus, and when receiving second DCI larger in size than the first DCI, transmits the UL data by cooperating between the antenna port of the terminal and the antenna port of the other transmitting apparatus and performs transmission of a physical uplink shared channel (PUSCH) as the UL data in a spatial relation equal to a spatial relation of an antenna port for transmission of a sounding reference signal (SRS) as the UL data.

2. The terminal according to claim 1, wherein the transmission path for at least the part of the UL data corresponding to initial transmission and the transmission path for at least the part of the UL data corresponding to retransmission are separately configured.

3. The terminal according to claim 1, wherein when the processor retransmits UL data not having been notified to the second terminal out of the UL data in the initial transmission, the processor performs control to notify the second terminal of the UL data not having been notified to the second terminal.

4. The terminal according to claim 1, wherein the processor determines whether or not to cooperate with the second terminal and transmit the UL data, based on a parameter corresponding to the DCI.

5. The terminal according to claim 2, wherein when the processor retransmits UL data not having been notified to the second terminal out of the UL data in the initial transmission, the processor performs control to notify the second terminal of the UL data not having been notified to the second terminal.

6. The terminal according to claim 2, wherein the processor determines whether or not to cooperate with the second terminal and transmit the UL data, based on a parameter corresponding to the DCI.

7. The terminal according to claim 3, wherein the processor determines whether or not to cooperate with the second terminal and transmit the UL data, based on a parameter corresponding to the DCI.

8. A radio communication method for a terminal, comprising:

receiving information related to a transmission path for at least a part of UL data;

determining at least one of a transmission method of the UL data and a second terminal other than the terminal, the second terminal being notified of at least the part of the UL data, based on at least one of the information related to the transmission path and downlink control information (DCI) used for scheduling of the UL data; and transmitting, when receiving first DCI as the DCI, the UL data without cooperating between an antenna port of the terminal and an antenna port of an other transmitting apparatus, and when receiving second DCI larger in size than the first DCI, transmitting the UL data by cooperating between the antenna port of the terminal and the antenna port of the other transmitting apparatus and performing transmission of a physical uplink shared channel (PUSCH) as the UL data in a spatial relation equal to a spatial relation of an antenna port for transmission of a sounding reference signal (SRS) as the UL data.

9. A base station comprising:

a transmitter that transmits information related to a transmission path for at least a part of UL data to a terminal;

a processor that indicates, for the terminal, at least one of a transmission method of the UL data and a second terminal other than the terminal, the second terminal being notified of at least the part of the UL data, by using at least one of the information related to the transmission path and downlink control information (DCI) used for scheduling of the UL data; and a receiver that, when transmitting first DCI as the DCI, receives the UL data without cooperating between an antenna port of the terminal and an antenna port of an other transmitting apparatus, and when transmitting second DCI larger in size than the first DCI, receives the UL data by cooperating between the antenna port of the terminal and the antenna port of the other transmitting apparatus and performs receiving of a physical uplink shared channel (PUSCH) as the UL data in a spatial relation equal to a spatial relation of an antenna port for transmission of a sounding reference signal (SRS) as the UL data.

* * * * *